(12) United States Patent
Miyashita et al.

(10) Patent No.: US 12,509,091 B2
(45) Date of Patent: Dec. 30, 2025

(54) AGRICULTURAL ROAD IDENTIFICATION SYSTEM, CONTROL SYSTEM, AND AGRICULTURAL MACHINE

(71) Applicant: KUBOTA CORPORATION, Osaka (JP)

(72) Inventors: Shunsuke Miyashita, Sakai (JP); Yusuke Murata, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 83 days.

(21) Appl. No.: 18/734,399

(22) Filed: Jun. 5, 2024

(65) Prior Publication Data

US 2024/0317238 A1    Sep. 26, 2024

Related U.S. Application Data

(63) Continuation of application No. PCT/JP2022/042918, filed on Nov. 18, 2022.

(30) Foreign Application Priority Data

Dec. 6, 2021    (JP) ................ 2021-197662

(51) Int. Cl.
*A01B 69/00*    (2006.01)
*B60W 40/06*    (2012.01)
*G06Q 50/02*    (2012.01)
*G05D 1/02*    (2020.01)

(52) U.S. Cl.
CPC .............. *B60W 40/06* (2013.01); *G06Q 50/02* (2013.01); *B60W 2420/403* (2013.01)

(58) Field of Classification Search
CPC ............. A01B 69/00; G05D 1/02; G08G 1/00
See application file for complete search history.

(56) References Cited

U.S. PATENT DOCUMENTS

| | | | |
|---|---|---|---|
| 2017/0354078 A1* | 12/2017 | Foster | A01B 69/00 |
| 2018/0024549 A1* | 1/2018 | Hurd | G05D 1/0016 701/2 |
| 2020/0281110 A1* | 9/2020 | McNichols | G06N 5/02 |

FOREIGN PATENT DOCUMENTS

| | | |
|---|---|---|
| JP | 2021-029218 A | 3/2021 |
| JP | 2021-130401 A | 9/2021 |

* cited by examiner

*Primary Examiner* — Tan Q Nguyen
(74) *Attorney, Agent, or Firm* — Keating & Bennett, LLP

(57) ABSTRACT

An agricultural road identification system includes at least one sensor to sense a ground on which an agricultural machine is to travel, to acquire a first sensing data, and to sense a surrounding environment of the agricultural machine to acquire a second sensing data, and a processor configured or programmed to acquire a first information on a transverse profile of the ground based on the first sensing data, to acquire a second information on the surrounding environment based on the second sensing data, and to identify whether a road on the ground is an agricultural road or not based on the first information and the second information.

20 Claims, 17 Drawing Sheets

AGRICULTURAL ROAD IDENTIFICATION SYSTEM, CONTROL SYSTEM, AND AGRICULTURAL MACHINE

CROSS REFERENCE TO RELATED APPLICATIONS

This application claims the benefit of priority to Japanese Patent Application No. 2021-197662 filed on Dec. 6, 2021 and is a Continuation Application of PCT Application No. PCT/JP2022/042918 filed on Nov. 18, 2022. The entire contents of each application are hereby incorporated herein by reference.

BACKGROUND OF THE INVENTION

1. Field of the Invention

The present disclosure relates to agricultural road identification systems for agricultural machines performing self-driving, control systems including such agricultural road identification systems, and agricultural machines including such control systems.

2. Description of Related Art

Research and development has been directed to the automation of agricultural machines. For example, work vehicles, such as tractors, combines, and rice transplanters, which automatically travel within fields by utilizing a positioning system, e.g., a GNSS (Global Navigation Satellite System), are coming into practical use. Research and development is also under way for work vehicles which automatically travel not only within fields, but also outside the fields.

For example, Japanese Laid-Open Patent Publication No. 2021-029218 discloses a system to cause an unmanned work vehicle to automatically travel between two fields separated from each other with a road being sandwiched therebetween. Japanese Laid-Open Patent Publication No. 2021-029218 also discloses a system that stores data on an agricultural road connecting a plurality of fields to each other and determines whether the agricultural road is passable or not. Japanese Laid-Open Patent Publication No. 2021-130401 discloses a controller that, when a predetermined condition that, for example, a road on which a four-wheel drive is to travel is an agricultural road is fulfilled, sets a driving force to be conveyed to rear wheels of the four-wheel drive to at least a predetermined level. The controller of Japanese Laid-Open Patent Publication No. 2021-130401 acquires information on the type of the road stored in an information provision server of the Intelligence Transport System and thus determines whether the road on which the four-wheel drive is to travel is an agricultural road or not.

SUMMARY OF THE INVENTION

When performing self-driving, an agricultural machine is required to be capable of identifying whether the road on which the agricultural machine is to travel is an agricultural road or not, in any of various environments.

Example embodiments of the present invention provide systems capable of identifying whether a road on which an agricultural machine performing self-driving is to travel is an agricultural road or not, in any of various environments.

An agricultural road identification system according to an example embodiment of the present disclosure is an agricultural road identification system for an agricultural machine performing self-driving. The agricultural road identification system includes at least one sensor to sense a ground on which the agricultural machine is to travel, to acquire a first sensing data, and to sense a surrounding environment of the agricultural machine to acquire a second sensing data; and a processor to acquire a first information on a transverse profile of the ground based on the first sensing data, to acquire a second information on the surrounding environment based on the second sensing data, and to identify whether a road on the ground is an agricultural road or not based on the first information and the second information.

General or specific aspects of example embodiments of the present disclosure may be implemented using a device, a system, a method, an integrated circuit, a computer program, a non-transitory computer-readable storage medium, or any combination thereof. The computer-readable storage medium may be inclusive of a volatile storage medium or a non-volatile storage medium. The device may include a plurality of devices. In the case where the device includes two or more devices, the two or more devices may be disposed within a single apparatus, or divided over two or more separate apparatuses.

Example embodiments of the present disclosure provide systems, for agricultural machines performing self-driving, that are each capable of identifying whether a road on which the agricultural machine is to travel is an agricultural road or not, in any of various environments.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
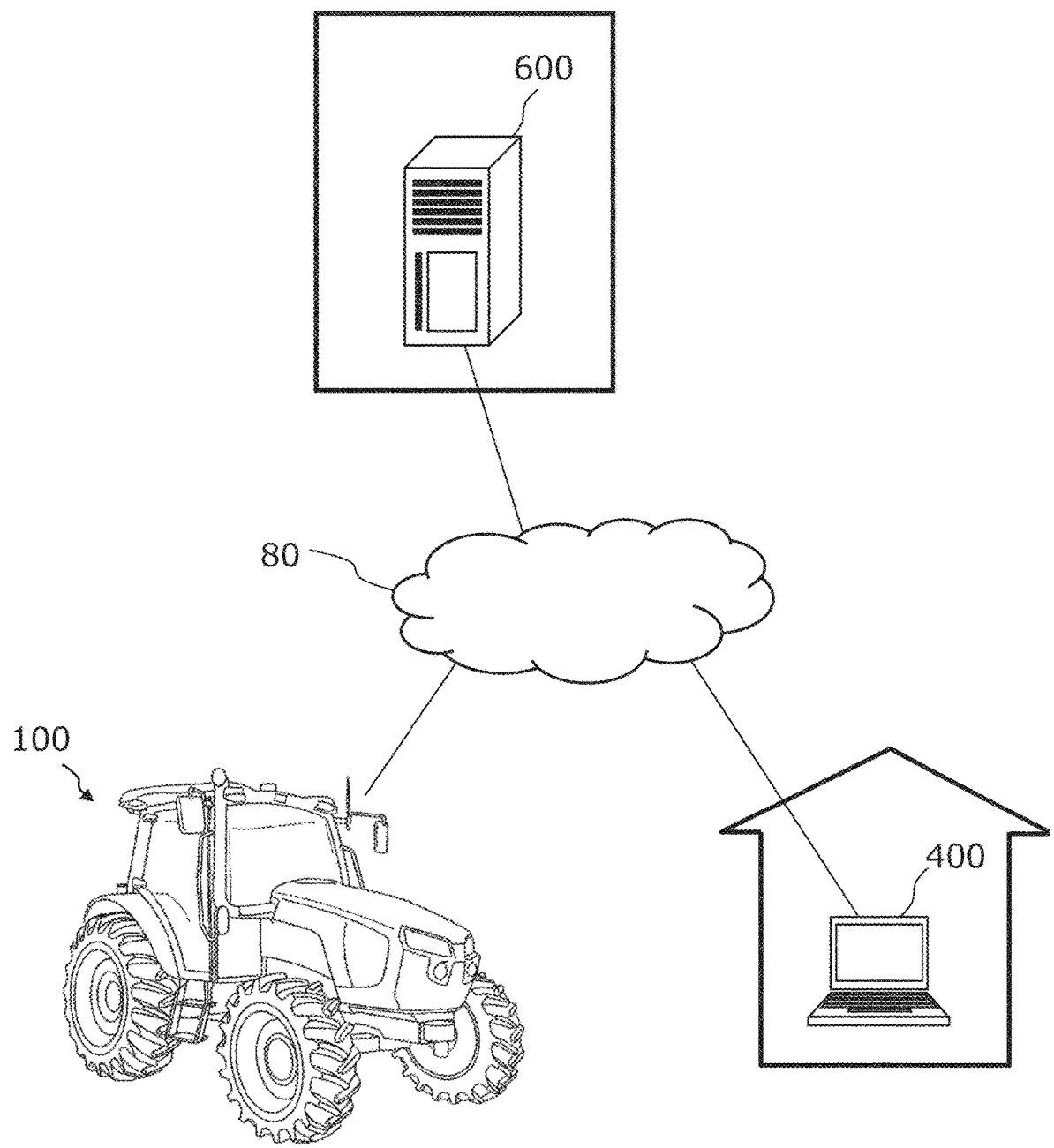
FIG. 1 is a diagram providing an overview of an agriculture management system according to an illustrative example embodiment of the present invention.

In the present disclosure, an "agricultural machine" refers to a machine for agricultural applications. Examples of agricultural machines include tractors, harvesters, rice transplanters, vehicles for crop management, vegetable transplanters, mowers, seeders, spreaders, and mobile robots for agriculture. Not only may a work vehicle such as a tractor function as an "agricultural machine" alone by itself, but also a combination of a work vehicle and an implement that is attached to, or towed by, the work vehicle may function as an "agricultural machine". For the ground surface inside a field, the agricultural machine performs agricultural work such as tilling, seeding, preventive pest control, manure spreading, planting of crops, or harvesting. Such agricultural work or tasks may be referred to as "groundwork", or simply as "work" or "tasks". Travel of a vehicle-type agricultural machine performed while the agricultural machine also performs agricultural work may be referred to as "tasked travel".

"Self-driving" refers to controlling the movement of an agricultural machine by the action of a controller, rather than through manual operations of a driver. An agricultural machine that performs self-driving may be referred to as a "self-driving agricultural machine" or a "robotic agricultural machine". During self-driving, not only the movement of the agricultural machine, but also the operation of agricultural work (e.g., the operation of the implement) may be controlled automatically. In the case where the agricultural machine is a vehicle-type machine, travel of the agricultural machine via self-driving will be referred to as "self-traveling". The controller may be configured or programmed to control at least one of: steering that is required in the movement of the agricultural machine, adjustment of the moving speed, or beginning or ending of a move. In the case of controlling a work vehicle having an implement attached thereto, the controller may be configured or programmed to control raising or lowering of the implement, beginning and ending of an operation of the implement, and so on. A move based on self-driving may include not only moving of an agricultural machine that goes along a predetermined path toward a destination, but also moving of an agricultural machine that follows a target of tracking. An agricultural machine that performs self-driving may also move partly based on the user's instructions. Moreover, an agricultural machine that performs self-driving may operate not only in a self-driving mode but also in a manual driving mode, where the agricultural machine moves through manual operations of the driver. When performed not manually but through the action of a controller, the steering of an agricultural machine will be referred to as "automatic steering". A portion of, or the entirety of, the controller may reside outside the agricultural machine. Control signals, commands, data, etc., may be communicated between the agricultural machine and a controller residing outside the agricultural machine. An agricultural machine that performs self-driving may move autonomously while sensing the surrounding environment, without any person being involved in the controlling of the movement of the agricultural machine. An agricultural machine that is capable of autonomous movement is able to travel inside the field or outside the field (e.g., on roads) in an unmanned manner. During an autonomous move, operations of detecting and avoiding obstacles may be performed.

A "work plan" is data defining a plan of one or more tasks of agricultural work to be performed by an agricultural machine. The work plan may include, for example, information representing the order of the tasks of agricultural work to be performed by an agricultural machine or the field where each of the tasks of agricultural work is to be performed. The work plan may include information representing the time and the date when each of the tasks of agricultural work is to be performed. In particular, the work plan including information representing the time and the date when each of the tasks of agricultural work is to be performed is referred to as a "work schedule" or simply as a "schedule". The work schedule may include information representing the time when each task of agricultural work is to be begun and/or ended on each of working days. The work plan or the work schedule may include information representing, for each task of agricultural work, the contents of the task, the implement to be used, and/or the types and amounts of agricultural supplies to be used. As used herein, the term "agricultural supplies" refers to goods used for agricultural work to be performed by an agricultural machine. The agricultural supplies may also be referred to simply as "supplies". The agricultural supplies may include goods consumed by agricultural work such as, for example, agricultural chemicals, fertilizers, seeds, or seedlings. The work plan may be created by a processor configured or programmed to communicate with the agricultural machine to manage the agricultural machine or a processor mounted on the agricultural machine. The processor can be configured or programmed to create a work plan based on, for example, information input by the user (agricultural business executive, agricultural worker, etc.) manipulating a terminal device. In this specification, the processor configured or programmed to communicate with the agricultural machine to manage the agricultural machine will be referred to as a "management device". The management device may manage agricultural work of a plurality agricultural machines. In this case, the management device may create a work plan including information on each task of agricultural work to be performed by each of the plurality of agricultural machines. The work plan may be downloaded to each of the agricultural machines and stored in a storage device in each of the agricultural machines. In order to perform the scheduled agricultural work in accordance with the work plan, each agricultural machine can automatically move to a field and perform the agricultural work.

An "environment map" is data representing, with a predetermined coordinate system, the position or the region of an object existing in the environment where the agricultural machine moves. The environment map may be referred to simply as a "map" or "map data". The coordinate system defining the environment map is, for example, a world coordinate system such as a geographic coordinate system fixed to the globe. Regarding the object existing in the environment, the environment map may include information other than the position (e.g., attribute information or other types of information). The "environment map" encompasses various type of maps such as a point cloud map and a lattice map. Data on a local map or a partial map that is generated or processed in a process of constructing the environment map is also referred to as a "map" or "map data".

A "global path" is data on a path connecting a departure point to a target point of an automatic movement of the agricultural machine, and is generated by a processor performing path planning. Generation of such a global path is referred to as "global path planning". In the following description, the global path will be referred to also as a "target path" or simply as a "path". The global path may be defined by, for example, coordinate values of a plurality of points which the agricultural machine is to pass. Such a point that the agricultural machine is to pass is referred as a "waypoint", and a line segment connecting waypoints adjacent to each other is referred to as a "link".

A "local path" is a path by which the agricultural machine can avoid an obstacle, and is consecutively generated while the agricultural machine is automatically moving along the global path. Generation of such a local path is referred to as "local path planning". The local path is consecutively generated based on data acquired by one or more sensors included in the agricultural machine, during a movement of the agricultural machine. The local path may be defined by a plurality of waypoints along a portion of the global path. Note that in the case where there is an obstacle in the vicinity of the global path, the waypoints may be set so as to detour around the obstacle. The length of a link between the waypoints on the local path is shorter than the length of a link between the waypoints on the global path. The device generating the local path may be the same as, or different from, the device generating the global path. For example, the management device managing the agricultural work to be performed by the agricultural machine may generate the global path, whereas the controller mounted on the agricultural machine may generate the local path. In this case, a combination of the management device and the controller functions as a "processor" performing the path planning. The controller of the agricultural machine may function as a processor performing both of global path planning and local path planning.

An "agricultural road" is a road used mainly for agriculture. An "agricultural road" is not limited to a road paved with asphalt, and encompasses unpaved roads covered with soil, gravel or the like. An "agricultural road" encompasses roads (including private roads) on which only vehicle-type agricultural machines (e.g., work vehicles such as tractors, etc.) are allowed to travel and roads on which general vehicles (automobiles, trucks, buses, etc.) are also allowed to travel. The work vehicles may automatically travel on a general road in addition to an agricultural road. The "general road" is a road maintained for traffic of general vehicles.

Example Embodiments

Hereinafter, example embodiments of the present disclosure will be described. Note, however, that unnecessarily detailed descriptions may be omitted. For example, detailed descriptions on what is well known in the art or redundant descriptions on what is substantially the same configuration may be omitted. This is to avoid lengthy description, and facilitate the understanding of those skilled in the art. The accompanying drawings and the following description, which are provided by the present inventors so that those skilled in the art can sufficiently understand the present disclosure, are not intended to limit the scope of the claims. In the following description, elements having identical or similar functions are denoted by identical reference numerals.

The following example embodiments are only exemplary, and the techniques according to the present disclosure are not limited to the following example embodiments. For example, numerical values, shapes, materials, steps, orders of steps, layout of a display screen, etc., which are indicated in the following example embodiments are only exemplary, and admit of various modifications so long as it makes technological sense. Any one implementation may be combined with another so long as it makes technological sense to do so.

Hereinafter, example embodiments in which techniques according to the present disclosure are applied to a work vehicle, such as a tractor, which is an example of agricultural machine, will be mainly described. The techniques according to the present disclosure are also applicable to other types of agricultural machines in addition to the work vehicle such as a tractor.

FIG. 1 is a diagram providing an overview of an agriculture management system according to an illustrative example embodiment of the present disclosure. The agriculture management system shown in FIG. 1 includes a work vehicle 100, a terminal device 400, and a management device 600. The terminal device 400 is a computer used by a user performing remote monitoring of the work vehicle 100. The management device 600 is a computer managed by a business operator running the agriculture management system. The work vehicle 100, the terminal device 400 and the management device 600 can communicate with each other via the network 80. FIG. 1 shows one work vehicle 100, but the agriculture management system may include a plurality of the work vehicles or any other agricultural machine.

The work vehicle 100 according to the present example embodiment is a tractor. The work vehicle 100 can have an implement attached to its rear and/or its front. While performing agricultural work in accordance with a particular type of implement, the work vehicle 100 is able to travel inside a field. The work vehicle 100 may travel inside the field or outside the field with no implement being attached thereto.

The work vehicle 100 has a self-driving function. In other words, the work vehicle 100 can travel by the action of a controller, rather than manually. The controller according to the present example embodiment is provided inside the work vehicle 100, and is configured or programmed to control both the speed and steering of the work vehicle 100. The work vehicle 100 can perform self-traveling outside the field (e.g., on roads) as well as inside the field.

The work vehicle 100 includes a device usable for positioning or localization, such as a GNSS receiver or an LiDAR sensor. Based on the position of the work vehicle 100 and information on a target path, the controller of the work vehicle 100 causes the work vehicle 100 to automatically travel. In addition to controlling the travel of the work vehicle 100, the controller also may be configured or programmed to control the operation of the implement. As a result, while automatically traveling inside the field, the work vehicle 100 is able to perform agricultural work by using the implement. In addition, the work vehicle 100 is able to automatically travel along the target path on a road outside the field (e.g., an agricultural road or a general road). In the case of performing self-traveling on a road outside the field, the work vehicle 100 travels while generating, along the target path, a local path along which the work vehicle 100 can avoid an obstacle, based on data output from a sensor such as a camera or a LiDAR sensor. The work vehicle 100 can also detect an agricultural road based on the data output from the sensor and travel while generating a local path on the agricultural road. This allows the work vehicle 100 to perform self-traveling appropriately on the agricultural road even if a global path is not correctly set on the agricultural road. Inside the field, the work vehicle 100 may travel while generating a local path in substantially the same manner as described above, or may perform an operation of traveling along the target path without generating a local path and halting when an obstacle is detected.

The management device 600 is a computer to manage the agricultural work performed by the work vehicle 100. The management device 600 may be, for example, a server computer that performs centralized management on information regarding the field on the cloud and supports agriculture by use of the data on the cloud. The management device 600, for example, creates a work plan for the work vehicle 100 and performs global path planning for the work vehicle 100 in accordance with the work plan. The management device 600 generates a global path (target path) inside the field and a global path (target path) outside the field by different methods from each other. The management device 600 generates a target path inside the field based on information regarding the field. For example, the management device 600 can generate a target path inside the field based on various types of previously registered information such as the outer shape of the field, the area size of the field, the position of the entrance/exit of the field, the width of the work vehicle 100, the width of the implement, the contents of the work, the types of crops to be grown, the region where the crops are to be grown, the growing states of the crops, and the interval between rows or ridges of the crops. The management device 600 generates a target path inside the field based on, for example, information input by the user by use of the terminal device 400 or any other device. The management device 600 generates a path inside the field such that the path covers, for example, the entirety of a work area where the work is to be performed. Meanwhile, the management device 600 generates a path outside the field in accordance with the work plan or the user's instructions. For example, the management device 600 can generate a target path outside the field based on various types of information such as the order of tasks of agricultural work indicated by the work plan, the position of the field where each task of agricultural work is to be performed, the position of the entrance/exit of the field, the time when each task of agricultural work is to begin and/or end, the state of the road surface, the state of weather or the traffic state. The management device 600 may generate a target path based on information representing the path or the waypoints specified by the user manipulating the terminal device 400, without relying on the work plan. In addition, the management device 600 may generate or edit an environment map based on data collected by the work vehicle 100 or any other movable body by use of the sensor such as a LiDAR sensor. The management device 600 transmits data on the work plan, the target path and the environment map thus generated to the work vehicle 100. The work vehicle 100 automatically moves and performs agricultural work based on the data.

The global path planning and the generation (or editing) of the environment map may be performed by any other device than the management device 600. For example, the controller of the work vehicle 100 may perform global path planning, or the generation or editing of the environment map.

The terminal device 400 is a computer that is used by a user who is at a remote place from the work vehicle 100. The terminal device 400 shown in FIG. 1 is a laptop computer, but the terminal device 400 is not limited to this. The terminal device 400 may be a stationary computer such as a desktop PC (personal computer), or a mobile terminal such as a smartphone or a tablet computer. The terminal device 400 may be used to perform remote monitoring of the work vehicle 100 or remote-manipulate the work vehicle 100. For example, the terminal device 400 can display, on a display screen thereof, a video captured by one or more cameras (imagers) included in the work vehicle 100. The user can watch the video to check the state of the surroundings of the work vehicle 100 and instruct the work vehicle 100 to halt or begin traveling. The terminal device 400 can also display, on the display screen thereof, a setting screen allowing the user to input information necessary to create a work plan (e.g., a schedule of each task of agricultural work) for the work vehicle 100. When the user inputs necessary information to the setting screen and performs a manipulation to transmit the information, the terminal device 400 transmits the input information to the management device 600. The management device 600 creates a work plan based on the information. The terminal device 400 may further have a function of displaying, on a display screen thereof, a setting screen allowing the user to input information necessary to set a target path.

Hereinafter, a configuration and an operation of the system according to the present example embodiment will be described in more detail.

Figure 2:
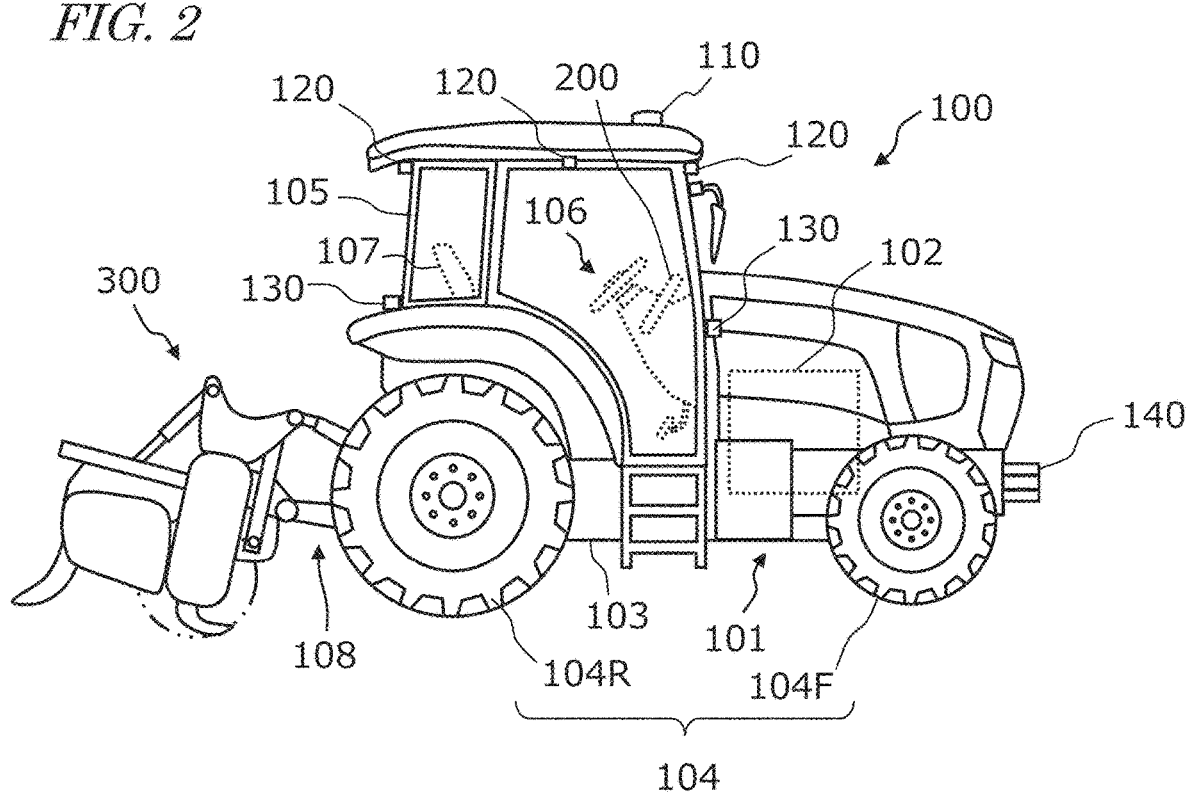
FIG. 2 is a side view schematically showing an example of work vehicle and an example of implement that is linked to the work vehicle.

FIG. 2 is a side view schematically showing an example of the work vehicle 100 and an example of implement 300 linked to the work vehicle 100. The work vehicle 100 according to the present example embodiment can operate both in a manual driving mode and a self-driving mode. In the self-driving mode, the work vehicle 100 is able to perform unmanned travel. The work vehicle 100 can perform self-driving both inside a field and outside the field.

As shown in FIG. 2, the work vehicle 100 includes a vehicle body 101, a prime mover (engine) 102, and transmission 103. On the vehicle body 101, wheels 104 with tires and a cabin 105 are provided. The wheels 104 include a pair of front wheels 104F and a pair of rear wheels 104R. Inside the cabin 105, a driver's seat 107, a steering device 106, an operational terminal 200, and switches for manipulation are provided. In the case where the work vehicle 100 performs tasked travel inside the field, the front wheels 104F and/or the rear wheels 104R may be replaced with a (plurality of) wheel(s) (crawler(s)) provided with a continuous track(s), instead of a wheel(s) provided with a tire(s).

The work vehicle 100 includes a plurality of sensors sensing the surroundings of the work vehicle 100. In the example shown in FIG. 2, the sensors include a plurality of cameras 120, a LiDAR sensor 140, and a plurality of obstacle sensors 130.

The cameras 120 may be provided at the front/rear/right/left of the work vehicle 100, for example. The cameras 120 image the surrounding environment of the work vehicle 100 and generate image data. The images acquired by the cameras 120 may be transmitted to the terminal device 400, which is responsible for remote monitoring. The images may be used to monitor the work vehicle 100 during unmanned driving. The cameras 120 may also be used to generate images to allow the work vehicle 100, traveling on a road outside the field (an agricultural road or a general road), to recognize objects, obstacles, white lines, road signs, traffic signs or the like in the surroundings of the work vehicle 100.

The LiDAR sensor 140 in the example shown in FIG. 2 is disposed on a bottom portion of a front surface of the vehicle body 101. The LiDAR sensor 140 may be disposed at any other position. While the work vehicle 100 is traveling mainly outside the field, the LiDAR sensor 140 repeatedly outputs sensor data representing the distance and the direction between an object existing in the surrounding environment thereof and each of measurement points, or a two-dimensional or three-dimensional coordinate values of each of the measurement points. The sensor data output from the LiDAR sensor 140 is processed by the controller of the work vehicle 100. The controller can perform localization of the work vehicle 100 by matching the sensor data against the environment map. The controller can further detect an object such as an obstacle existing in the surroundings of the work vehicle 100 based on the sensor data, and generate, along the global path, a local path along which the work vehicle 100 needs to actually proceed. The controller can utilize an algorithm as, such for example, SLAM (Simultaneous Localization and Mapping) to generate or edit an environment map. The work vehicle 100 may include a plurality of LiDAR sensors disposed at different positions with different orientations.

The plurality of obstacle sensors 130 shown in FIG. 2 are provided at the front and the rear of the cabin 105. The obstacle sensors 130 may be disposed at other positions. For example, one or more obstacle sensors 130 may be disposed at any position at the sides, the front or the rear of the vehicle body 101. The obstacle sensors 130 may include, for example, a laser scanner or an ultrasonic sonar. The obstacle sensors 130 may be used to detect obstacles in the surroundings of the work vehicle 100 during self-traveling to cause the work vehicle 100 to halt or detour around the obstacles. The LiDAR sensor 140 may be used as one of the obstacle sensors 130.

The work vehicle 100 further includes a GNSS unit 110. The GNSS unit 110 includes a GNSS receiver. The GNSS receiver may include an antenna to receive a signal(s) from a GNSS satellite(s) and a processor to calculate the position of the work vehicle 100 based on the signal(s) received by the antenna. The GNSS unit 110 receives satellite signals transmitted from the plurality of GNSS satellites, and performs positioning based on the satellite signals. GNSS is the general term for satellite positioning systems such as GPS (Global Positioning System), QZSS (Quasi-Zenith Satellite System; e.g., MICHIBIKI), GLONASS, Galileo, and Bei-Dou. Although the GNSS unit 110 according to the present example embodiment is disposed above the cabin 105, it may be disposed at any other position.

The GNSS unit 110 may include an inertial measurement unit (IMU). Signals from the IMU can be used to complement position data. The IMU can measure a tilt or a small motion of the work vehicle 100. The data acquired by the IMU can be used to complement the position data based on the satellite signals, so as to improve the performance of positioning.

The controller of the work vehicle 100 may utilize, for positioning, the sensing data acquired by the sensors such as the cameras 120 or the LIDAR sensor 140, in addition to the positioning results provided by the GNSS unit 110. In the case where objects serving as characteristic points exist in the environment that is traveled by the work vehicle 100, as in the case of an agricultural road, a grove road, a general road or an orchard, the position and the orientation of the work vehicle 100 can be estimated with a high accuracy based on data that is acquired by the cameras 120 or the LiDAR sensor 140 and on an environment map that is previously stored in the storage device. By correcting or complementing position data based on the satellite signals using the data acquired by the cameras 120 or the LiDAR sensor 140, it becomes possible to identify the position of the work vehicle 100 with a higher accuracy.

The prime mover 102 may be a diesel engine, for example. Instead of a diesel engine, an electric motor may be used. The transmission 103 can change the propulsion and the moving speed of the work vehicle 100 through a speed changing mechanism. The transmission 103 can also switch between forward travel and backward travel of the work vehicle 100.

The steering device 106 includes a steering wheel, a steering shaft connected to the steering wheel, and a power steering device to assist in the steering by the steering wheel. The front wheels 104F are the wheels responsible for steering, such that changing their angle of turn (also referred to as "steering angle") can cause a change in the traveling direction of the work vehicle 100. The steering angle of the front wheels 104F can be changed by manipulating the steering wheel. The power steering device includes a hydraulic device or an electric motor to supply an assisting force to change the steering angle of the front wheels 104F. When automatic steering is performed, under the control of the controller disposed in the work vehicle 100, the steering angle may be automatically adjusted by the power of the hydraulic device or the electric motor.

A linkage device 108 is provided at the rear of the vehicle body 101. The linkage device 108 includes, e.g., a three-point linkage (also referred to as a "three-point link" or a "three-point hitch"), a PTO (Power Take Off) shaft, a universal joint, and a communication cable. The linkage device 108 allows the implement 300 to be attached to, or detached from, the work vehicle 100. The linkage device 108 is able to raise or lower the three-point link with a hydraulic device, for example, thus changing the position and/or attitude of the implement 300. Moreover, motive power can be sent from the work vehicle 100 to the implement 300 via the universal joint. While towing the implement 300, the work vehicle 100 allows the implement 300 to perform a predetermined task. The linkage device may be provided frontward of the vehicle body 101. In that case, the implement can be connected frontward of the work vehicle 100.

Although the implement 300 shown in FIG. 2 is a rotary tiller, the implement 300 is not limited to a rotary tiller. For example, any arbitrary implement such as a seeder, a spreader, a transplanter, a mower, a rake implement, a baler, a harvester, a sprayer, or a harrow, can be connected to the work vehicle 100 for use.

The work vehicle 100 shown in FIG. 2 can be driven by human driving; alternatively, it may only support unmanned driving. In that case, component elements which are only required for human driving, e.g., the cabin 105, the steering device 106, and the driver's seat 107 do not need to be provided in the work vehicle 100. An unmanned work vehicle 100 can travel via autonomous driving, or by remote operation by a user.

Figure 3:
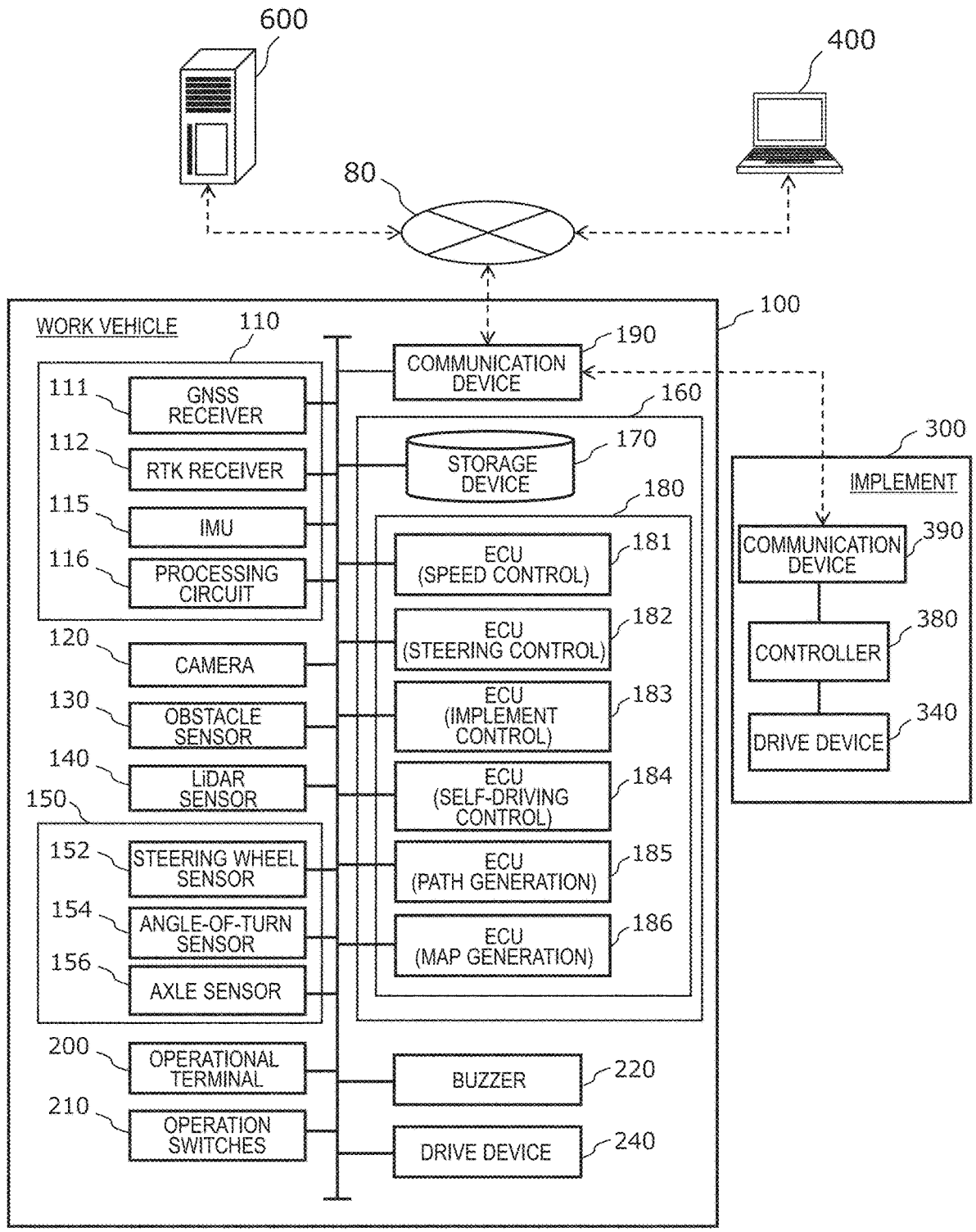
FIG. 3 is a block diagram showing an example configuration of the work vehicle and the implement.

FIG. 3 is a block diagram showing an example configuration of the work vehicle 100 and the implement 300. The work vehicle 100 and the implement 300 can communicate with each other via a communication cable that is included in the linkage device 108. The work vehicle 100 is able to communicate with the terminal device 400 and the management device 600 via the network 80.

In addition to the GNSS unit 110, the cameras 120, the obstacle sensors 130, the LiDAR sensor 140 and the operational terminal 200, the work vehicle 100 in the example of FIG. 3 includes sensors 150 to detect the operating status of the work vehicle 100, a control system 160, a communication device 190, operation switches 210, a buzzer 220, and a drive device 240. These component elements are communicably connected to each other via a bus. The GNSS unit 110 includes a GNSS S receiver 111, an RTK receiver 112, an inertial measurement unit (IMU) 115, and a processing circuit 116. The sensors 150 include a steering wheel sensor 152, an angle-of-turn sensor 154, and an axle sensor 156. The control system 160 includes a storage device 170 and a controller 180. The controller 180 includes a plurality of electronic control units (ECU) 181 to 186. The implement 300 includes a drive device 340, a controller 380, and a communication device 390. Note that FIG. 3 shows component elements which are relatively closely related to the operations of self-driving by the work vehicle 100, while other components are omitted from illustration.

The GNSS receiver 111 in the GNSS unit 110 receives satellite signals transmitted from the plurality of GNSS satellites and generates GNSS data based on the satellite signals. The GNSS data is generated in a predetermined format such as, for example, the NMEA-0183 format. The GNSS data may include, for example, the identification number, the angle of elevation, the angle of direction, and a value representing the reception strength of each of the satellites from which the satellite signals are received.

Figure 4:
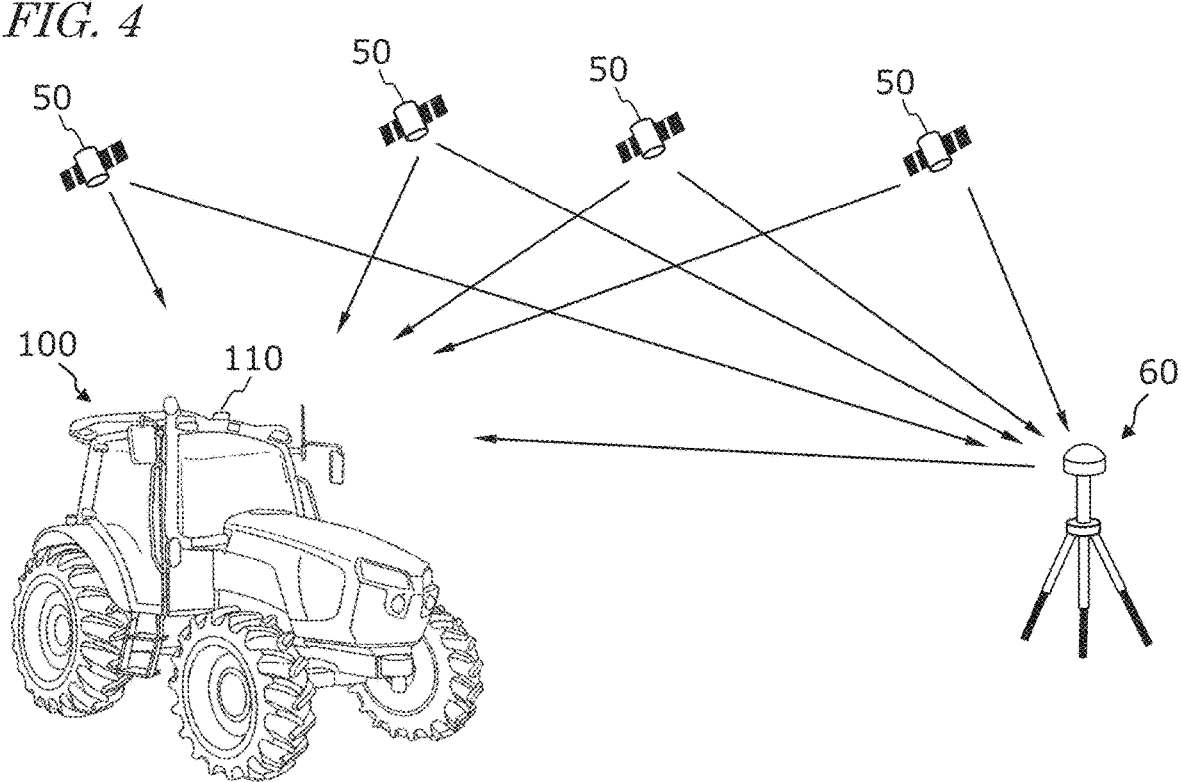
FIG. 4 is a conceptual diagram showing an example of the work vehicle performing positioning based on an RTK-GNSS.

The GNSS unit 110 shown in FIG. 3 performs positioning of the work vehicle 100 by utilizing an RTK (Real Time Kinematic)-GNSS. FIG. 4 is a conceptual diagram showing an example of the work vehicle 100 performing positioning based on the RTK-GNSS. In the positioning based on the RTK-GNSS, not only satellite signals transmitted from a plurality of GNSS satellites 50, but also a correction signal that is transmitted from a reference station 60 is used. The reference station 60 may be disposed near the field where the work vehicle 100 performs tasked travel (e.g., at a position within 10 km of the work vehicle 100). The reference station 60 generates a correction signal of, for example, an RTCM format based on the satellite signals received from the plurality of GNSS satellites 50, and transmits the correction signal to the GNSS unit 110. The RTK receiver 112, which includes an antenna and a modem, receives the correction signal transmitted from the reference station 60. Based on the correction signal, the processing circuit 116 of the GNSS unit 110 corrects the results of the positioning performed by use of the GNSS receiver 111. Use of the RTK-GNSS enables positioning with an accuracy on the order of several centimeters of errors, for example. Positional information including latitude, longitude, and altitude information is acquired through the highly accurate positioning by the RTK-GNSS. The GNSS unit 110 calculates the position of the work vehicle 100 as frequently as, for example, one to ten times per second.

Note that the positioning method is not limited to being performed by use of an RTK-GNSS; any arbitrary positioning method (e.g., an interferometric positioning method or a relative positioning method) that provides positional information with the necessary accuracy can be used. For example, positioning may be performed by utilizing a VRS (Virtual Reference Station) or a DGPS (Differential Global Positioning System). In the case where positional information with the necessary accuracy can be obtained without the use of the correction signal transmitted from the reference station 60, positional information may be generated without using the correction signal. In that case, the GNSS unit 110 does not need to include the RTK receiver 112.

Even in the case where the RTK-GNSS is used, at a site where the correction signal from the reference station 60 cannot be acquired (e.g., on a road far from the field), the position of the work vehicle 100 is estimated by another method with no use of the signal from the RTK receiver 112. For example, the position of the work vehicle 100 may be estimated by matching the data output from the LiDAR sensor 140 and/or the cameras 120 against a highly accurate environment map.

The GNSS unit 110 according to the present example embodiment further includes the IMU 115. The IMU 115 may include a 3-axis accelerometer and a 3-axis gyroscope. The IMU 115 may include a direction sensor such as a 3-axis geomagnetic sensor. The IMU 115 functions as a motion sensor which can output signals representing parameters such as acceleration, velocity, displacement, and attitude of the work vehicle 100. Based not only on the satellite signals and the correction signal but also on a signal that is output from the IMU 115, the processing circuit 116 can estimate the position and orientation of the work vehicle 100 with a higher accuracy. The signal that is output from the IMU 115 may be used for the correction or complementation of the position that is calculated based on the satellite signals and the correction signal. The IMU 115 outputs a signal more frequently than the GNSS receiver 111. Utilizing this signal that is output highly frequently, the processing circuit 116 allows the position and orientation of the work vehicle 100 to be measured more frequently (e.g., about 10 Hz or above). Instead of the IMU 115, a 3-axis accelerometer and a 3-axis gyroscope may be separately provided. The IMU 115 may be provided as a separate device from the GNSS unit 110.

The cameras 120 are imagers that image the surrounding environment of the work vehicle 100. Each of the cameras 120 includes an image sensor such as a CCD (Charge Coupled Device) or a CMOS (Complementary Metal Oxide Semiconductor), for example. In addition, each camera 120 may include an optical system including one or more lenses and a signal processing circuit. During travel of the work vehicle 100, the cameras 120 image the surrounding environment of the work vehicle 100, and generate image data (e.g., motion picture data). The cameras 120 are able to capture motion pictures at a frame rate of 3 frames/second (fps: frames per second) or greater, for example. The images generated by the cameras 120 may be used by a remote supervisor to check the surrounding environment of the work vehicle 100 with the terminal device 400, for example. The images generated by the cameras 120 may also be used for the purpose of positioning and/or detection of obstacles. As shown in FIG. 2, the plurality of cameras 120 may be provided at different positions on the work vehicle 100, or a single camera 120 may be provided. A visible camera(s) to generate visible light images and an infrared camera(s) to generate infrared images may be separately provided. Both of a visible camera(s) and an infrared camera(s) may be provided as cameras for generating images for monitoring purposes. The infrared camera(s) may also be used for detection of obstacles at nighttime.

The obstacle sensors 130 detect objects existing in the surroundings of the work vehicle 100. Each of the obstacle sensors 130 may include a laser scanner or an ultrasonic sonar, for example. When an object exists at a position within a predetermined distance from one of the obstacle sensors 130, the obstacle sensor 130 outputs a signal indicating the presence of the obstacle. The plurality of obstacle sensors 130 may be provided at different positions on the work vehicle 100. For example, a plurality of laser scanners and a plurality of ultrasonic sonars may be disposed at different positions on the work vehicle 100. Providing such a great number of obstacle sensors 130 can reduce blind spots in monitoring obstacles in the surroundings of the work vehicle 100.

The steering wheel sensor 152 measures the angle of rotation of the steering wheel of the work vehicle 100. The angle-of-turn sensor 154 measures the angle of turn of the front wheels 104F, which are the wheels responsible for steering. Measurement values by the steering wheel sensor 152 and the angle-of-turn sensor 154 are used for steering control by the controller 180.

The axle sensor 156 measures the rotational speed, i.e., the number of revolutions per unit time, of an axle that is connected to the wheels 104. The axle sensor 156 may be a sensor: including a magnetoresistive element (MR), a Hall generator, or an electromagnetic pickup, for example. The axle sensor 156 outputs a numerical value indicating the number of revolutions per minute (unit: rpm) of the axle, for example. The axle sensor 156 is used to measure the speed of the work vehicle 100.

The drive device 240 includes various types of devices required to cause the work vehicle 100 to travel and to drive the implement 300; for example, the prime mover 102, the transmission 103, the steering device 106, the linkage device 108 and the like described above. The prime mover 102 may include an internal combustion engine such as, for example, a diesel engine. The drive device 240 may include an electric motor for traction instead of, or in addition to, the internal combustion engine.

The buzzer 220 is an audio output device to present an alarm sound to alert the user of an abnormality. For example, the buzzer 220 may present an alarm sound when an obstacle is detected during self-driving. The buzzer 220 is controlled by the controller 180.

The storage device 170 includes one or more storage mediums such as a flash memory or a magnetic disc. The storage device 170 stores various data that is generated by the GNSS unit 110, the cameras 120, the obstacle sensors 130, the LiDAR sensor 140, the sensors 150, and the controller 180. The data that is stored by the storage device 170 may include map data on the environment where the work vehicle 100 travels (environment map) and data on a global path (target path) for self-driving. The environment map includes information on a plurality of f fields where the work vehicle 100 performs agricultural work and roads around the fields. The environment map and the target path may be generated by a processor in the management device 600. The controller 180 according to the present example embodiment has a function of generating or editing an environment map and a target path. The controller 180 can edit the environment map and the target path, acquired from the management device 600, in accordance with the environment where the work vehicle 100 travels. The storage device 170 also stores data on a work plan received by the communication device 190 from the management device 600. The work plan includes information on a plurality of tasks of agricultural work to be performed by the work vehicle 100 over a plurality of working days. The work plan may be, for example, data on a work schedule including information on the time when the work vehicle 100 is scheduled to perform each task of agricultural work on each of the working days. The storage device 170 also stores a computer program(s) to cause each of the ECUs in the controller 180 to perform various operations described below. Such a computer program(s) may be provided to the work vehicle 100 via a storage medium (e.g., a semiconductor memory, an optical disc, etc.) or through telecommunication lines (e.g., the Internet). Such a computer program(s) may be marketed as commercial software.

The controller 180 includes the plurality of ECUs. The plurality of ECUs include, for example, the ECU 181 for speed control, the ECU 182 for steering control, the ECU 183 for implement control, the ECU 184 for self-driving control, the ECU 185 for path generation, and the ECU 186 for map generation.

The ECU 181 controls the prime mover 102, the transmission 103 and brakes included in the drive device 240, thus controlling the speed of the work vehicle 100.

The ECU 182 controls the hydraulic device or the electric motor included in the steering device 106 based on a measurement value of the steering wheel sensor 152, thus controlling the steering of the work vehicle 100.

In order to cause the implement 300 to perform a desired operation, the ECU 183 controls the operations of the three-point link, the PTO shaft and the like that are included in the linkage device 108. Also, the ECU 183 generates a signal to control the operation of the implement 300, and transmits this signal from the communication device 190 to the implement 300.

Based on data output from the GNSS unit 110, the cameras 120, the obstacle sensors 130, the LiDAR sensor 140 and the sensors 150, the ECU 184 performs computation and control for achieving self-driving. For example, the ECU 184 specifies the position of the work vehicle 100 based on the data output from at least one of the GNSS unit 110, the cameras 120 and the LiDAR sensor 140. Inside the field, the ECU 184 may determine the position of the work vehicle 100 based only on the data output from the GNSS unit 110. The ECU 184 may estimate or correct the position of the work vehicle 100 based on the data acquired by the cameras 120 or the LiDAR sensor 140. Use of the data acquired by the cameras 120 or the LiDAR sensor 140 allows the accuracy of the positioning to be further improved. Outside the field, the ECU 184 estimates the position of the work vehicle 100 by use of the data output from the LiDAR sensor 140 or the cameras 120. For example, the ECU 184 may estimate the position of the work vehicle 100 by matching the data output from the LiDAR sensor 140 or the cameras 120 against the environment map. During self-driving, the ECU 184 performs computation necessary for the work vehicle 100 to travel along a target path or a local path, based on the estimated position of the work vehicle 100. The ECU 184 sends the ECU 181 a command to change the speed, and sends the ECU 182 a command to change the steering angle. In response to the command to change the speed, the ECU 181 controls the prime mover 102, the transmission 103 or the brakes to change the speed of the work vehicle 100. In response to the command to change the steering angle, the ECU 182 controls the steering device 106 to change the steering angle.

While the work vehicle 100 is traveling along the target path, the ECU 185 consecutively generates a local path along which the work vehicle 100 can avoid an obstacle. For example, during travel of the work vehicle 100, the ECU 185 recognizes an agricultural road and an obstacle existing in the surroundings of the work vehicle 100 based on the data output from the cameras 120, the obstacle sensors 130 and the LiDAR sensor 140. The ECU 185 generates a local path on the agricultural road such that the work vehicle 100 avoids the recognized obstacle. The ECU 185 may have a function of performing global path planning instead of the management device 600. In this case, the ECU 185 determines a destination of the work vehicle 100 based on the work plan stored in the storage device 170, and determines a target path from a beginning point to a target point of the movement of the work vehicle 100. For example, the ECU 185 can generate, as the target path, a path by which the work vehicle 100 can arrive at the destination within the shortest time period, based on the environment map stored in the storage device 170 and including information on the roads.

The ECU 186 generates or edits a map of the environment where the work vehicle 100 travels. In the present example embodiment, an environment map generated by an external device such as the management device 600 is transmitted to the work vehicle 100 and recorded in the storage device 170. Instead, the ECU 186 can generate or edit an environment map. Hereinafter, an operation in a case where the ECU 186 generates an environment map will be described. An environment map may be generated based on sensor data output from the LiDAR sensor 140. For generating an environment map, the ECU 186 consecutively generates three-dimensional point cloud data based on the sensor data output from the LiDAR sensor 140 while the work vehicle 100 is traveling. The ECU 186 can generate an environment map by connecting the point cloud data consecutively generated by use of an algorithm such as, for example, SLAM. The environment map generated in this manner is a highly accurate three-dimensional map, and may be used for localization performed by the ECU 184. Based on this three-dimensional map, a two-dimensional map usable for the global path planning may be generated. In this specification, the three-dimensional map that is used for the localization and the two-dimensional map that is used for the global path planning will be both referred to as an "environment map". The ECU 186 can further edit the map by adding, to the map, various types of attribute information on a structural body, the state of the road surface, how easily the road is passable, or the like that is recognized based on the data output from the camera 120 or the LiDAR sensor 140.

Through the actions of these ECUs, the controller 180 realizes self-driving. During self-driving, the controller 180 controls the drive device 240 based on the measured or estimated position of the work vehicle 100 and on the target path. As a result, the controller 180 can cause the work vehicle 100 to travel along the target path.

The plurality of ECUs included in the controller 180 can communicate with each other in accordance with a vehicle bus standard such as, for example, a CAN (Controller Area Network). Instead of the CAN, faster communication methods such as Automotive Ethernet (registered trademark) may be used. Although the ECUs 181 to 186 are illustrated as individual blocks in FIG. 3, the function of each of the ECU 181 to 186 may be implemented by a plurality of ECUs. Alternatively, an onboard computer that integrates the functions of at least some of the ECUs 181 to 186 may be provided. The controller 180 may include ECUs other than the ECUs 181 to 186, and any number of ECUs may be provided in accordance with functionality. Each ECU includes a processing circuit including one or more processors.

The communication device 190 is a device including a circuit communicating with the implement 300, the terminal device 400 and the management device 600. The communication device 190 includes circuitry to perform exchanges of signals complying with an ISOBUS standard such as ISOBUS-TIM, for example, between itself and the communication device 390 of the implement 300. This allows the implement 300 to perform a desired operation, or allows information to be acquired from the implement 300. The communication device 190 may further include an antenna and a communication circuit to exchange signals via the network 80 with communication devices of the terminal device 400 and the management device 600. The network 80 may include a 3G, 4G, 5G, or any other cellular mobile communications network and the Internet, for example. The communication device 190 may have a function of communicating with a mobile terminal that is used by a supervisor who is situated near the work vehicle 100. With such a mobile terminal, communication may be performed based on any arbitrary wireless communication standard, e.g., Wi-Fi (registered trademark), 3G, 4G, 5G or any other cellular mobile communication standard, or Bluetooth (registered trademark).

The operational terminal 200 is a terminal for the user to perform a manipulation related to the travel of the work vehicle 100 and the operation of the implement 300, and is also referred to as a virtual terminal (VT). The operational terminal 200 may include a display device such as a touch screen panel, and/or one or more buttons. The display device may be a display such as a liquid crystal display or an organic light-emitting diode (OLED) display, for example. By manipulating the operational terminal 200, the user can perform various manipulations, such as, for example, switching ON/OFF the self-driving mode, recording or editing an environment map, setting a target path, and switching ON/OFF the implement 300. At least a portion of these manipulations may also be realized by manipulating the operation switches 210. The operational terminal 200 may be configured so as to be detachable from the work vehicle 100. A user who is at a remote place from the work vehicle 100 may manipulate the detached operational terminal 200 to control the operation of the work vehicle 100. Instead of the operational terminal 200, the user may manipulate a computer on which necessary application software is installed, for example, the terminal device 400, to control the operation of the work vehicle 100.

Figure 5:
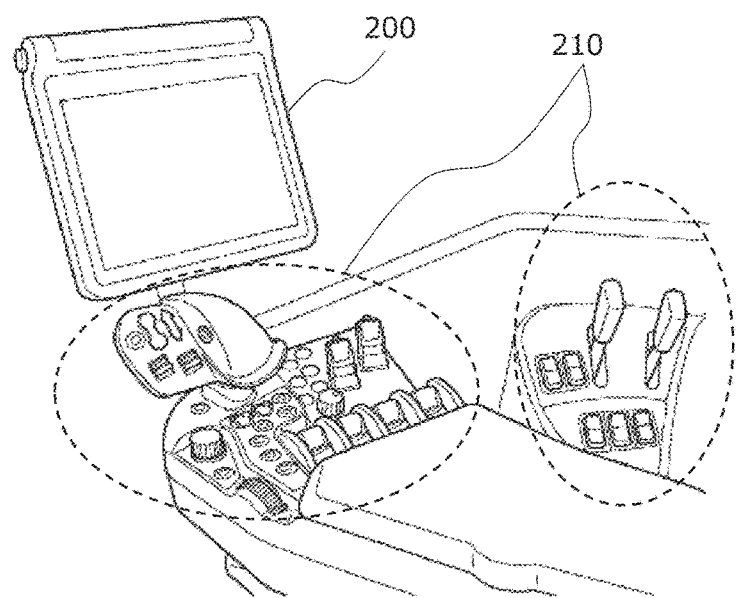
FIG. 5 is a diagram showing an example of operational terminal and an example of operation switches disposed in a cabin.

FIG. 5 is a diagram showing an example of the operational terminal 200 and an example of the operation switches 210 both provided in the cabin 105. In the cabin 105, the operation switches 210, including a plurality of switches that are manipulable to the user, are disposed. The operation switches 210 may include, for example, a switch to select the gear shift as to a main gear shift or a range gear shift, a switch to switch between a self-driving mode and a manual driving mode, a switch to switch between forward travel and backward travel, a switch to raise or lower the implement 300, and the like. In the case where the work vehicle 100 only performs unmanned driving and lacks human driving functionality, the work vehicle 100 does not need to include the operation switches 210.

The drive device 340 in the implement 300 shown in FIG. 3 performs operations necessary for the implement 300 to perform predetermined work. The drive device 340 includes a device suitable for uses of the implement 300, for example, a hydraulic device, an electric motor, a pump or the like. The controller 380 controls the operation of the drive device 340. In response to a signal that is transmitted from the work vehicle 100 via the communication device 390, the controller 380 causes the drive device 340 to perform various operations. Moreover, a signal that is in accordance with the state of the implement 300 can be transmitted from the communication device 390 to the work vehicle 100.

Figure 6:
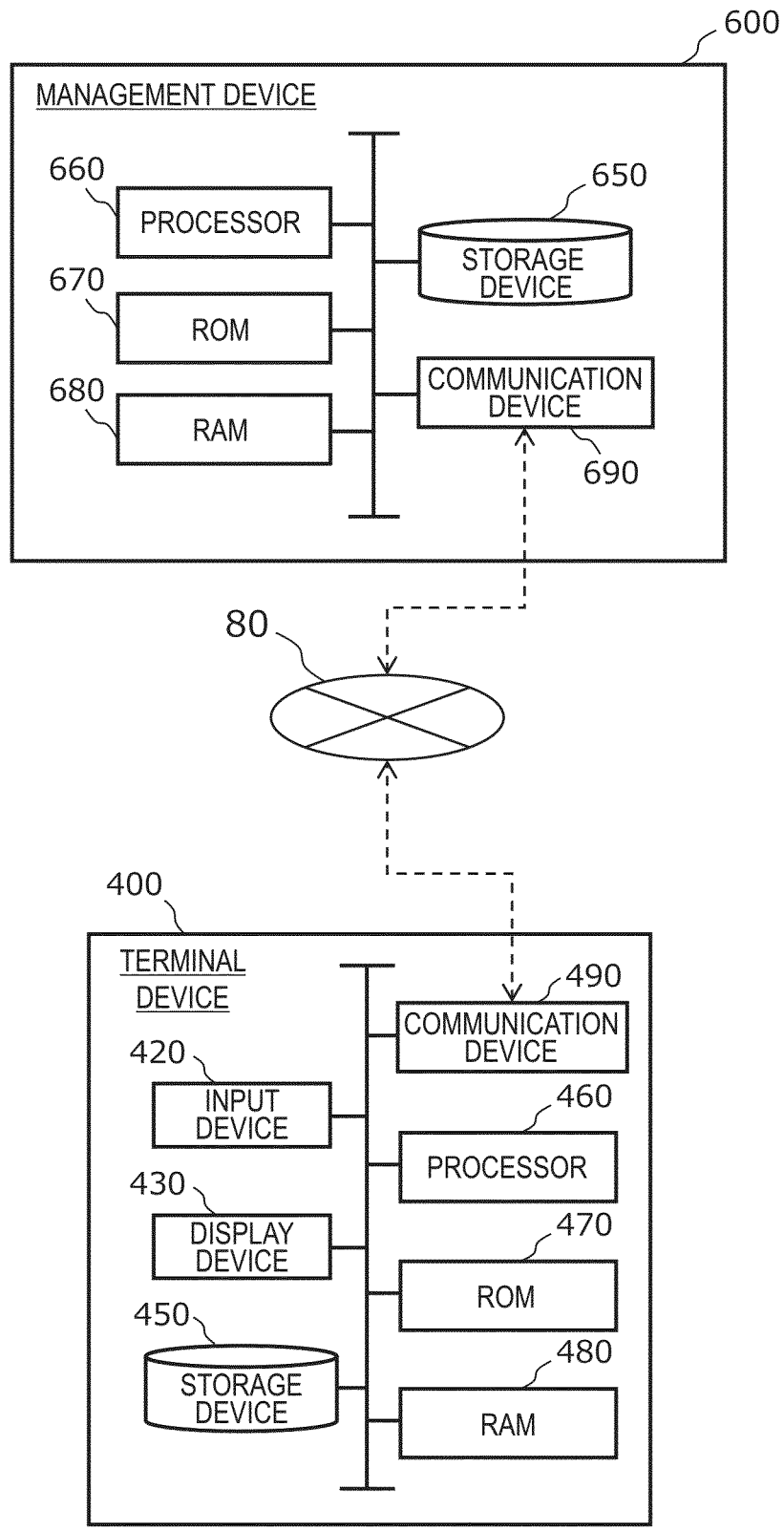
FIG. 6 is a block diagram showing an example of hardware configuration of a management device and a terminal device.

Now, a configuration of the management device 600 and the terminal device 400 will be described with reference to FIG. 6. FIG. 6 is a block diagram showing an example of schematic hardware configuration of the management device 600 and the terminal device 400.

The management device 600 includes a storage device 650, a processor 660, a ROM (Read Only Memory) 670, a RAM (Random Access Memory) 680, and a communication device 690. These component elements are communicably connected to each other via a bus. The management device 600 may function as a cloud server to manage the schedule of the agricultural work to be performed by the work vehicle 100 in a field and support agriculture by use of the data managed by the management device 600 itself. The user can input information necessary to create a work plan by use of the terminal device 400 and upload the information on the work plan to the management device 600 via the network 80. The management device 600 can create a schedule of agricultural work, that is, a work plan based on the information. The management device 600 can further generate or edit an environment map and perform global path planning for the work vehicle 100. The environment map may be distributed from a computer external to the management device 600.

The communication device 690 is a communication module to communicate with the work vehicle 100 and the terminal device 400 via the network 80. The communication device 690 can perform wired communication in compliance with communication standards such as, for example, IEEE 1394 (registered trademark) or Ethernet (registered trademark). The communication device 690 may perform wireless communication in compliance with Bluetooth (registered trademark) or Wi-Fi, or cellular mobile communication based on 3G, 4G, 5G or any other cellular mobile communication standard.

The processor 660 may include, for example, a semiconductor integrated circuit including a central processing unit (CPU). The processor 660 may be realized by a microprocessor or a microcontroller. Alternatively, the processor 660 may be realized by an FPGA (Field Programmable Gate Array), a GPU (Graphics Processing Unit), an ASIC (Application Specific Integrated Circuit) or an ASSP (Application Specific Standard Product) each including a CPU, or a combination of two or more selected from these circuits. The processor 660 consecutively executes a computer program, describing commands to execute at least one process, stored in the ROM 670 and thus realizes a desired process.

The ROM 670 is, for example, a writable memory (e.g., PROM), a rewritable memory (e.g., flash memory) or a memory which can only be read from but cannot be written to. The ROM 670 stores a program to control operations of the processor 660. The ROM 670 does not need to be a single storage medium, and may be an assembly of a plurality of storage mediums. A portion of the assembly of the plurality of storage memories may be a detachable memory.

The RAM 680 provides a work area in which the control program stored in the ROM 670 is once developed at the time of booting up. The RAM 680 does not need to be a single storage medium, and may be an assembly of a plurality of storage mediums.

The storage device 650 mainly functions as a storage for a database. The storage device 650 may be, for example, a magnetic storage device or a semiconductor storage device. An example of the magnetic storage device is a hard disc drive (HDD). An example of the semiconductor storage device is a solid state drive (SSD). The storage device 650 may be a device independent from the management device 600. For example, the storage device 650 may be a storage device connected to the management device 600 via the network 80, for example, a cloud storage.

The terminal device 400 includes an input device 420, a display device 430, a storage device 450, a processor 460, a ROM 470, a RAM 480, and a communication device 490. These component elements are communicably connected to each other via a bus. The input device 420 is a device to convert an instruction from the user into data and input the data to a computer. The input device 420 may be, for example, a keyboard, a mouse or a touch panel. The display device 430 may be, for example, a liquid crystal display or an organic EL display. The processor 460, the ROM 470, the RAM 480, the storage device 450 and the communication device 490 are substantially the same as the corresponding component elements described above regarding the example of the hardware configuration of the management device 600, and will not be described in repetition.

Now, an operation of the work vehicle 100, the terminal device 400 and the management device 600 will be described.

First, an example operation of self-traveling of the work vehicle 100 will be described. The work vehicle 100 according to the present example embodiment can automatically travel both inside and outside a field. Inside the field, the work vehicle drives implement 300 to perform predetermined agricultural work while traveling along a preset target path. When detecting an obstacle by the obstacle sensors 130 thereof while traveling inside the field, the work vehicle 100 halts traveling and performs operations of presenting an alarm sound from the buzzer 220, transmitting an alert signal to the terminal device 400 and the like. Inside the field, the positioning of the work vehicle 100 is performed based mainly on data output from the GNSS unit 110. Meanwhile, outside the field, the work vehicle 100 automatically travels along a target path set for an agricultural road or a general road outside the field. While traveling outside the field, the work vehicle 100 performs local path planning based on data acquired by the cameras 120 or the LiDAR 140. For example, while traveling outside the field, the work vehicle 100 can detect an agricultural road based on the data acquired by the cameras 120 or the LiDAR sensor 140 and travel while generating a local path on the agricultural road. When an obstacle is detected outside the field, the work vehicle 100 avoids the obstacle or halts at the point. Outside the field, the position of the work vehicle 100 is estimated based on data output from the LiDAR sensor 140 or the cameras 120 in addition to positioning data output from the GNSS unit 110.

Hereinafter, an operation of the work vehicle 100 performing self-traveling inside the field will be described. An operation of the work vehicle 100 performing self-traveling outside the field and a process of global path planning and local path planning outside the field will be described later.

Figure 7:
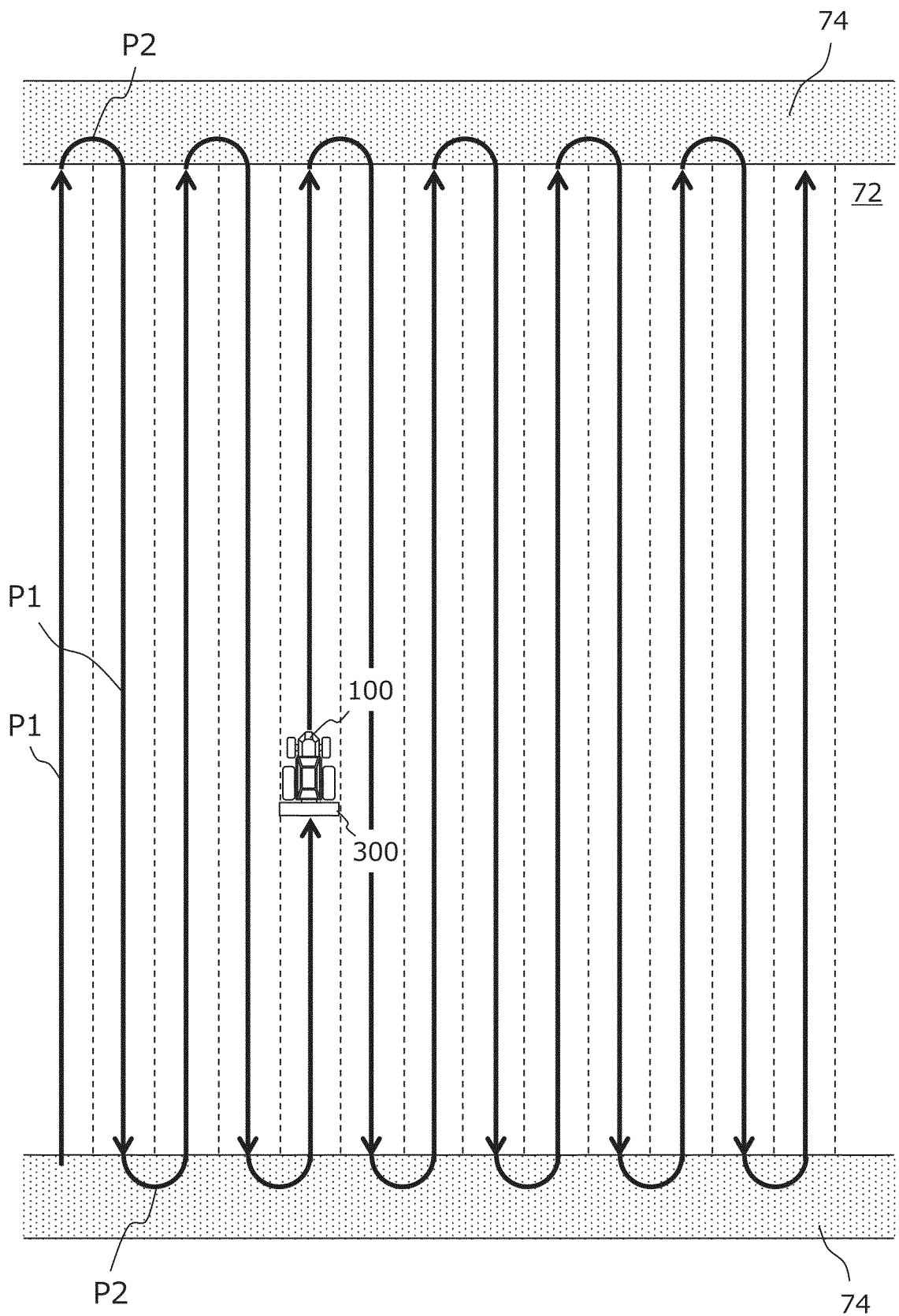
FIG. 7 is a diagram schematically showing an example of the work vehicle automatically traveling along a target path inside a field.

FIG. 7 is a diagram schematically showing an example of the work vehicle 100 automatically traveling along a target path in a field. In this example, the field includes a work area 72, in which the work vehicle 100 performs work by using the implement 300, and headlands 74, which are located near outer edges of the field. The user may previously specify which regions of the field on the map would correspond to the work area 72 and the headlands 74. The target path in this example includes a plurality of main paths P1 parallel to each other and a plurality of turning paths P2 interconnecting the plurality of main paths P1. The main paths P1 are located in the work area 72, whereas the turning paths P2 are located in the headlands 74. Although each of the main paths P1 in FIG. 7 is illustrated as a linear path, each main path P1 may also include a curved portion(s). Broken lines in FIG. 7 depict the working breadth of the implement 300. The working breadth is previously set and recorded in the storage device 170. The working breadth may be set and recorded by the user manipulating the operational terminal 200 or the terminal device 400. Alternatively, the working breadth may be automatically recognized and recorded when the implement 300 is connected to the work vehicle 100. The interval between the plurality of main paths P1 may be set so as to be matched to the working breadth. The target path may be generated based on the manipulation made by the user, before self-driving is begun. The target path may be generated so as to cover the entire work area 72 in the field, for example. Along the target path shown in FIG. 7, the work vehicle 100 automatically travels while repeating a reciprocating motion from a beginning point of work to an ending point of work. Note that the target path shown in FIG. 7 is merely an example, and the target path may be arbitrarily determined.

Now, an example control by the controller 180 during self-driving inside the field will be described.

Figure 8:
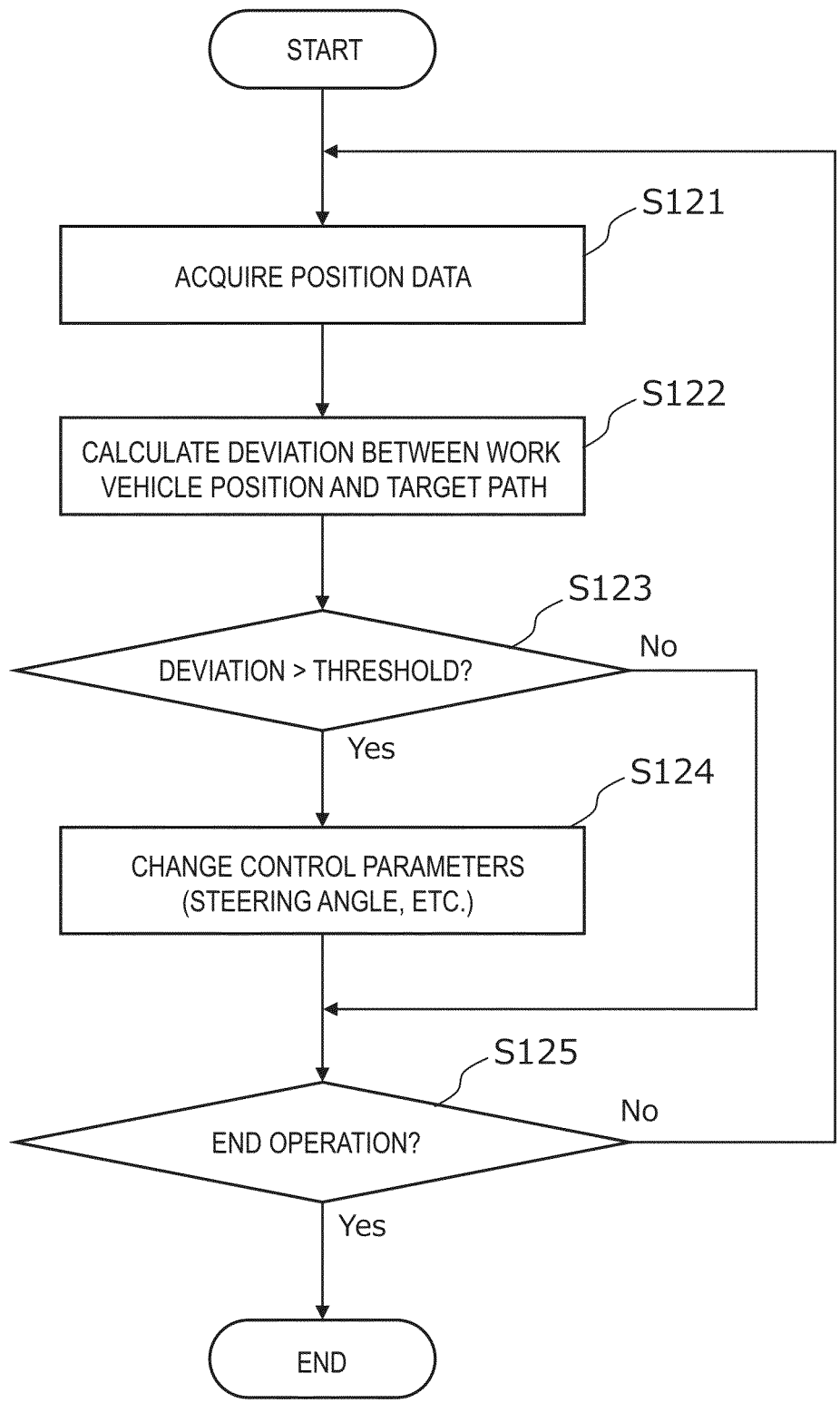
FIG. 8 is a flowchart showing an example operation of steering control during self-driving.

FIG. 8 is a flowchart showing an example operation of steering control to be performed by the controller 180 during self-driving. During travel of the work vehicle 100, the controller 180 performs automatic steering by performing the operation from steps S121 to S125 shown in FIG. 8. The speed of the work vehicle 100 will be maintained at a previously-set speed, for example. First, during travel of the work vehicle 100, the controller 180 acquires data representing the position of the work vehicle 100 that is generated by the GNSS unit 110 (step S121). Next, the controller 180 calculates a deviation between the position of the work vehicle 100 and the target path (step S122). The deviation represents the distance between the position of the work vehicle 100 and the target path at that moment. The controller 180 determines whether the calculated deviation in position exceeds the previously-set threshold or not (step S123). If the deviation exceeds the threshold, the controller 180 changes a control parameter of the steering device included in the drive device 240 so as to reduce the deviation, thus changing the steering angle (step S124). If the deviation does not exceed the threshold at step S123, the operation of step S124 is omitted. At the following step S125, the controller 180 determines whether a command to end the operation has been received or not. The command to end the operation may be given when the user has instructed that self-driving be suspended through remote operations, or when the work vehicle 100 has arrived at the destination, for example. If the command to end the operation has not been given, the control returns to step S121 and the controller 180 performs substantially the same operation based on a newly measured position of the work vehicle 100. The controller 180 repeats the operation from steps S121 to S125 until a command to end the operation is given. The aforementioned operation is executed by the ECUs 182 and 184 in the controller 180.

In the example shown in FIG. 8, the controller 180 controls the drive device 240 based only on the deviation between the position of the work vehicle 100 as identified by the GNSS unit 110 and the target path. Alternatively, a deviation in terms of directions may further be considered in the control. For example, when a directional deviation exceeds a previously-set threshold, where the directional deviation is an angle difference between the orientation of the work vehicle 100 as identified by the GNSS unit 110 and the direction of the target path, the controller 180 may change the control parameter of the steering device of the drive device 240 (e.g., steering angle) in accordance with the deviation.

Hereinafter, with reference to FIGS. 9A to 9D, an example of steering control by the controller 180 will be described more specifically.

Figure 9A:
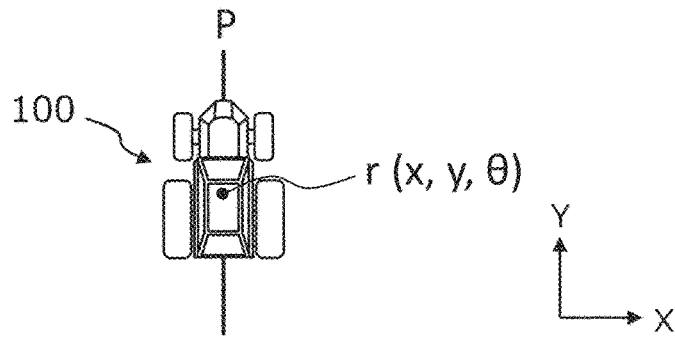
FIG. 9A is a diagram showing an example of the work vehicle traveling along a target path P.
Figure 9B:
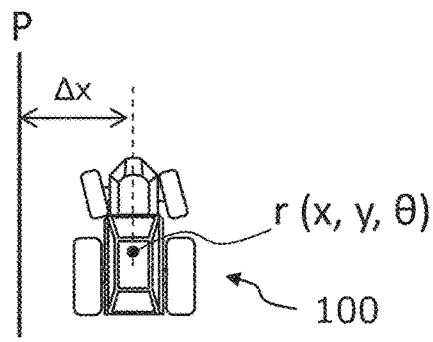
FIG. 9B is a diagram showing an example of the work vehicle at a position which is shifted rightward from the target path P.
Figure 9C:
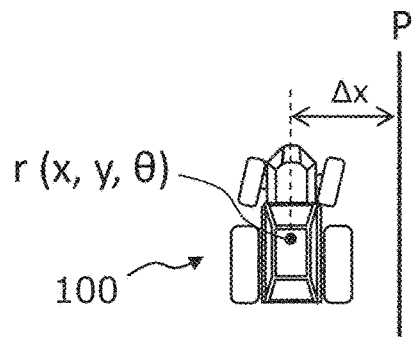
FIG. 9C is a diagram showing an example of the work vehicle at a position which is shifted leftward from the target path P.
Figure 9D:
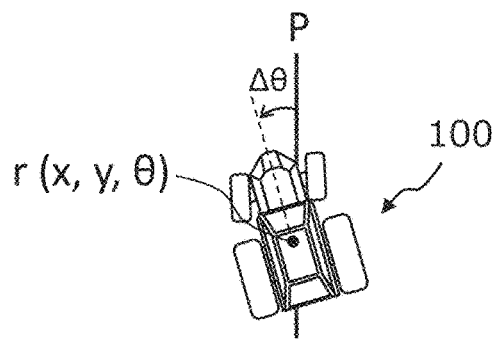
FIG. 9D is a diagram showing an example of the work vehicle oriented in an inclined direction with respect to the target path P.

FIG. 9A is a diagram showing an example of the work vehicle 100 traveling along a target path P. FIG. 9B is a diagram showing an example of the work vehicle 100 at a position which is shifted rightward from the target path P. FIG. 9C is a diagram showing an example of the work vehicle 100 at a position which is shifted leftward from the target path P. FIG. 9D is a diagram showing an example of the work vehicle 100 oriented in an inclined direction with respect to the target path P. In these figures, the pose, i.e., the position and orientation, of the work vehicle 100 as measured by the GNSS unit 110 is expressed as r (x, y, θ). Herein, (x, y) are coordinates representing the position of a reference point on the work vehicle 100 in an XY coordinate system, which is a two-dimensional coordinate system fixed to the globe. In the examples shown in FIGS. 9A to 9D, the reference point on the work vehicle 100 is at a position, on the cabin, where a GNSS antenna is disposed, but the reference point may be at any arbitrary position. θ is an angle representing the measured orientation of the work vehicle 100. Although the target path P is shown parallel to the Y axis in the examples illustrated in these figures, the target path P may not necessarily be parallel to the Y axis, in general.

As shown in FIG. 9A, in the case where the position and orientation of the work vehicle 100 are not deviated from the target path P, the controller 180 maintains the steering angle and speed of the work vehicle 100 without changing them.

As shown in FIG. 9B, when the position of the work vehicle 100 is shifted rightward from the target path P, the controller 180 changes the steering angle so that the traveling direction of the work vehicle 100 will be inclined leftward, thus bringing the work vehicle 100 closer to the path P. At this point, not only the steering angle but also the speed may be changed. The magnitude of the steering angle may be adjusted in accordance with the magnitude of a positional deviation Δx, for example.

As shown in FIG. 9C, when the position of the work vehicle 100 is shifted leftward from the target path P, the controller 180 changes the steering angle so that the traveling direction of the work vehicle 100 will be inclined rightward, thus bringing the work vehicle 100 closer to the path P. In this case, too, not only the steering angle but also the speed may be changed. The amount of change of the steering angle may be adjusted in accordance with the magnitude of the positional deviation Δx, for example.

As shown in FIG. 9D, in the case where the position of the work vehicle 100 is not considerably deviated from the target path P but its orientation is nonetheless different from the direction of the target path P, the controller 180 changes the steering angle so that the directional deviation Δθ will become smaller. In this case, too, not only the steering angle but also the speed may be changed. The magnitude of the steering angle may be adjusted in accordance with the magnitudes of the positional deviation Δx and the directional deviation Δθ, for example. For instance, the amount of change of the steering angle (which is in accordance with the directional deviation Δθ) may be increased as the absolute value of the positional deviation Δx decreases. When the positional deviation Δx has a large absolute value, the steering angle will be changed greatly in order for the work vehicle 100 to return to the path P, so that the directional deviation Δθ will inevitably have a large absolute value. Conversely, when the positional deviation Δx has a small absolute value, the directional deviation Δθ needs to become closer to zero. Therefore, it may be advantageous to introduce a relatively large weight (i.e., control gain) for the directional deviation Δθ in determining the steering angle.

For the steering control and speed control of the work vehicle 100, control techniques such as PID control or MPC (Model Predictive Control) may be applied. Applying these control techniques will make for smoothness of the control of bringing the work vehicle 100 closer to the target path P.

Note that, when an obstacle is detected by one or more obstacle sensors 130 during travel, the controller 180 halts the work vehicle 100. At this point, the controller 180 may cause the buzzer 220 to present an alarm sound or may transmit an alert signal to the terminal device 400. In the case where the obstacle is avoidable, the controller 180 may control the drive device 240 such that the obstacle is avoided.

The work vehicle 100 according to the present example embodiment can perform self-traveling outside a field as well as inside the field. Outside the field, the controller 180 is able to detect an object located at a relatively distant position from the work vehicle 100 (e.g., another vehicle, a pedestrian, etc.) based on data output from the cameras 120 or the LiDAR sensor 140. The controller 180 generates a local path such that the local path avoids the detected object, and performs speed control and steering control along the local path. In this manner, self-traveling on a road outside the field can be realized.

Figure 10:
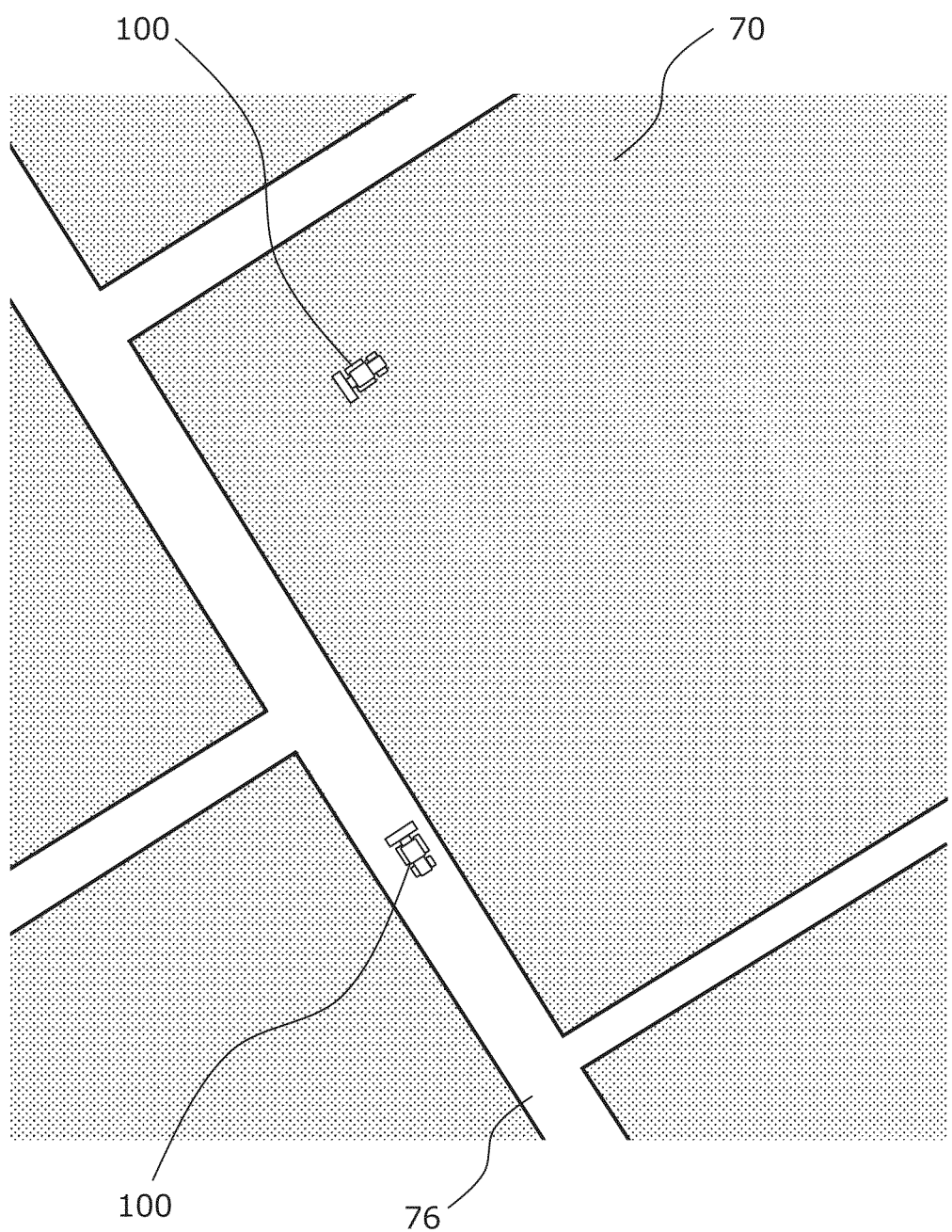
FIG. 10 is a diagram schematically showing an example of state where a plurality of the work vehicles perform self-traveling inside a field and on a road outside the field.

As described above, the work vehicle 100 according to the present example embodiment can automatically travel inside the field and outside the field in an unmanned manner. FIG. 10 is a diagram schematically showing an example of state where a plurality of the work vehicles 100 are performing self-traveling inside a field 70 and on a road 76 outside the field 70. In the storage device 170, an environment map of a region including a plurality of fields and roads around the fields, and a target path, are recorded. The environment map and the target path may be generated by the management device 600 or the ECU 185. In the case of traveling on a road, the work vehicle 100 travels along the target path while sensing the surroundings thereof by use of the sensors such as the cameras 120 and the LiDAR sensor 140, with the implement 300 being raised. During travel, the controller 180 consecutively generates a local path and causes the work vehicle 100 to travel along the local path. This allows the work vehicle 100 to perform self-traveling while avoiding obstacles. During travel, the target path may be changed in accordance with the state.

The sensors and the controller 180 of the work vehicle 100 according o the present example embodiment cooperate with each other to function as an agricultural road identification system for the work vehicle 100. The agricultural road identification system can identify whether a road on which the work vehicle 100 is to travel is an agricultural road or not. The agricultural road identification system is used mainly while the work vehicle 100 is automatically traveling outside the field. The agricultural road identification system can perform an operation of identifying whether the road is an agricultural road or not and generating a local path along the agricultural road. The agricultural road identification system may perform the identification on the agricultural road while the work vehicle 100 is traveling in a manual driving mode outside the field, and collect data on the position and the width of the agricultural road. The collected data may be used to generate a map including detailed information on the agricultural road.

In the example shown in FIG. 2, for example, the sensors of the work vehicle 100 include the plurality of cameras 120, the LiDAR sensor 140, and the plurality of obstacle sensors 130. The work vehicle 100 is not limited to having such a configuration, and may include at least one of the cameras 120, the obstacle sensors 130 and the LiDAR sensor 140. At least one of the sensors included in the work vehicle 100 may be used as a sensor of the agricultural road identification system. Herein, an example in which the sensor included in the work vehicle 100 is used as the sensor of the agricultural road identification system will be described, but the sensor of the agricultural road identification system is not limited to this. For example, a sensor included in another movable body such as an agricultural machine different from the work vehicle 100 or a drone (Unmanned Aerial Vehicle (UAV)) may be used as the sensor of the agricultural road identification system.

The sensor senses the ground on which the work vehicle 100 is to travel (e.g., the ground located in the traveling direction of the work vehicle 100) to acquire sensing data on the ground. This sensing data may be referred to as "first sensing data". The sensor also senses the surrounding environment of the work vehicle 100 to acquire sensing data on the surrounding environment including an object in addition to the ground. This sensing data may be referred to as "second sensing data". The first sensing data and the second sensing data may be acquired by the same sensor or by different sensors. For example, the camera 120 may acquire the first sensing data, whereas the LiDAR sensor 140 may acquire the second sensing data, or vice versa. Alternatively, both of the camera 120 and the LiDAR sensor 140 may be used to acquire one of, or the both of, the first sensing data and the second sensing data. The first sensing data acquired by the camera 120 may include image data of the ground on which the work vehicle 100 is to travel. The first sensing data acquired by the LiDAR sensor 140 may include point cloud data of the ground on which the work vehicle 100 is to travel. Similarly, the second sensing data acquired by the camera 120 as a result of sensing may include image data of the surrounding environment of the work vehicle 100. The second sensing data acquired by the LiDAR sensor 140 as a result of sensing may include point cloud data of the surrounding environment of the work vehicle 100.

The controller 180 of the work vehicle 100 functions as a processor to identify whether the road on which the work vehicle 100 is to travel is an agricultural road or not, based on the first sensing data and the second sensing data. Herein, an example in which the controller 180 functions as the processor of the agricultural road identification system will be described. A portion of, or the entirety of, the processes to be executed by the controller 180 in the agricultural road identification system may be executed by another device. Such another device may be any one of the management device 600 (processor 660), the terminal device 400 (processor 460) and the operational terminal 200. In the case where, for example, a portion of the processes to be executed by the controller 180 is executed by the processor 660 of the management device 600, a combination of the controller 180 and the management device 600 functions as a processor of the agricultural road identification system. Herein, an example in which the ECU 185 for path generation included in the controller 180 functions as processor of a the agricultural road identification system will be described. Such an agricultural road identification process may be executed by another ECU included in the controller 180. In addition to the ECUs 181 to 186, the controller 180 may further include an ECU to identify whether a road is an agricultural road or not.

The controller 180 acquires information on a transverse profile of the ground on which the work vehicle 100 is to travel, based on the first sensing data. The controller 180 also acquires information on the surrounding environment of the work vehicle 100 based on the second sensing data. The information on the transverse profile of the ground on which the work vehicle 100 is to travel may be referred to as "first information", and the information on the surrounding environment of the work vehicle 100 may be referred to as "second information".

The transverse profile of the ground on which the work vehicle 100 is to travel is a shape of the ground (i.e., the ground surface) in a direction crossing the direction in which the work vehicle 100 is to travel (hereinafter, such a direction crossing the direction in which the work vehicle 100 is to travel will be referred to as a "transverse direction"). The transverse profile may be acquired as, for example, a graph in which the horizontal axis represents the position on a scanning line in the transverse direction and the vertical axis represents the distance (i.e., the height or the depth) of the ground with respect to a reference surface, or as a table including information on such a graph. The "reference surface" is, for example, a horizontal surface, but may be an inclining surface in the case where the ground inclines as a whole. In the case where the sensor has a distance measuring capability, the distance from the reference surface to the ground can be calculated based on positional information of the sensor and information acquired by measuring the distance from the sensor to the ground on the scanning line. Examples of the sensor having such a distance measuring capability include a depth camera, an LiDAR sensor and a laser interferometer. In the case where the sensor is a camera that does not have a distance measuring capability, the height or the depth of the ground on the scanning line may be estimated from an image acquired by the camera, by use of an image processing technology. The controller 180 may acquire the transverse profile by, for example, measuring (or estimating) the inclination angle of the work vehicle 100 or the inclination angle of the sensor by use of the IMU 115 of the work vehicle 100, and correcting the first sensing data by use of the inclination angle. The controller 180 may generate a signal including the first information representing the transverse profile (the signal is referred to also as a "transverse profile signal") each time, for example, a certain time period elapses or each time the work vehicle 100 proceeds a certain distance, and record the transverse profile signal in the recording device 170. A distance corresponding to an interval between two continuous records of the transverse profile signal in a longitudinal direction (corresponding to the direction in which the work vehicle 100 is to travel) (the interval is referred to also as a "repetition interval"), in other words, the interval between scanning lines may be set to, for example, any value in the range of 1 cm to 50 cm.

The transverse profile does not need to include information on the accurate height or depth of the ground with respect to the reference surface. The transverse profile may include information roughly representing the size of protrusions and recesses, for example, "a rough region with large protrusions and recesses", "a rough region with small protrusions and recesses" or "an almost flat region".

The transverse profile may include information on the transverse gradient, that is, information on the gradient of the ground in a direction crossing the direction in which the work vehicle 100 is to travel. The transverse gradient is, for example, a value obtained by dividing a difference in height between a right end and a left end of a road by the width of the road. The transverse gradient may be determined as follows: each of the scanning lines is divided into a plurality of regions, and a difference in ground height between two ends of each region is divided by the width of the corresponding region. The obtained value may be determined as a partial transverse gradient. The controller 180 may detect the width (that is, the length in the transverse direction) of a travelable region of the road on which the work vehicle 100 is to travel, based on the first sensing data. A region, of each scanning line, corresponding to the travelable region may be used such that a difference in ground height between two ends of the region is divided by the width of the travelable region. The obtained value may be determined as the transverse gradient of the travelable region.

The information on the transverse profile of the ground on which the work vehicle 100 is to travel (first information) may also include data on a scanning line in a direction other than the transverse direction. In the present disclosure, any information including a profile of the ground (ground surface) in the transverse direction is referred to as the "first information".

The controller 180 may acquire the transverse profile of the ground each time, for example, the work vehicle 100 travels a predetermined distance (e.g., at least 1 meter). In this case, the controller 180 may cause the sensor to acquire the first sensing data each time the work vehicle 100 travels a predetermined distance.

In addition to the transverse profile of the ground, the controller 180 may further acquire a longitudinal profile of the ground, that is, a shape of the ground in the direction in which the work vehicle 100 is to travel, based on the first sensing data.

The information on the surrounding environment of the work vehicle 100 (second information) is information on the environment that may include an object other than the ground in the surroundings of the work vehicle 100. The second information is, for example, information on an object that exists in the surroundings of the work vehicle 100 (including, for example, the position, the type or the like of the object). The controller 180 can acquire the second information by, for example, recognizing one or a plurality of objects existing in the surroundings of the work vehicle 100, based on the second sensing data. The controller 180 may further identify the type(s) of the recognized object(s). The controller 180 may use machine learning to recognize the object(s) and to identify the type(s) of the object(s). The controller 180 may use, for example, an identification technology such as Semantic Segmentation using a convolutional neural network (CNN) to identify the type(s) of the object(s), based on the second sensing data such as the image data. The identification is not limited to using any specific algorithm, and may use any algorithm.

The controller 180 identifies whether the road on the ground where the work vehicle 100 is to travel is an agricultural road or not, based on the information on the transverse profile of the ground on which the work vehicle 100 is to travel and also based on the information on the surrounding environment of the work vehicle 100. For example, the controller 180 determines whether the information on the transverse profile of the ground on which the work vehicle 100 is to travel and the information on the surrounding environment of the work vehicle 100 fulfill one or a plurality of conditions to identify whether the road on the ground on which the work vehicle 100 is to travel is an agricultural road or not. The one or the plurality of conditions for the determination are predefined and may be recorded in the storage device 170 included in the work vehicle 100, the storage device 650 of the management device 600, the storage device 450 of the terminal device 400, or the like. The agricultural road identification system may be configured such that the user sets the condition(s) for the determination. Specific examples of the condition(s) for the determination will be described below.

The agricultural road identification system according to the present example embodiment can identify whether the road on which the agricultural machine is to travel is an agricultural road or not, based on sensing data on the ground on which the agricultural machine is to travel and sensing data on the surrounding environment of the agricultural machine. Therefore, the identification on whether the road on which the agricultural machine is to travel is an agricultural road or not can be made in any of various environments. For example, even in the case where the information on the type of the road is not obtained from the environment map or the Intelligence Transport System, the sensing data on the ground on which the agricultural machine is to travel and the sensing data on the surrounding environment of the agricultural machine can be used to identify whether the road is an agricultural road or not. The identification on whether the road is an agricultural road or not can be made in any of various environments, and therefore, the agricultural machine performing self-driving can travel more smoothly. To "identify whether a road is an agricultural road or not" is, in other words, to determine, for example, whether the road needs to be distinguished from a general road or not. The "general road" is a road maintained for traffic of general vehicles.

As described above, the "agricultural road" is a road mainly used for agriculture. The "agricultural road" may be roughly classified as an in-field agricultural road or a main agricultural road. The "in-field agricultural road" is an agricultural road mainly used for agricultural production activities, and encompasses agricultural roads used to, for example, go to a field and come back from the field, carry agricultural supplies into a field, harvest agricultural products, perform preventive pest control, carry agricultural products out from a field, etc. The "in-field agricultural road" encompasses, for example, a road connecting a field and another field to each other, a road connecting a field and a community of the people involved in agriculture to each other, a road connecting a field and an agricultural facility (e.g., a harvest collection and shipping site, a fruit sorting site, a rice product preparation facility, a rice product and storage facility, a compost production and marketing facility, etc.) to each other, and the like. The "main agricultural road" is a principal road of an agricultural district and is mainly used for distribution of agricultural products or agricultural supplies. The "main agricultural encompasses, for example, a road used to transport agricultural products to markets or districts where the agricultural products are to be consumed. The "main agricultural road" encompasses, for example, a road connecting an agricultural facility and a general road to each other.

Note that the criterion by which the agricultural road identification system according to an example embodiment of the present disclosure identifies that a road is an agricultural road is appropriately adjustable. That is, the agricultural road identification system does not need to identify all the roads fit to the above-described definitions as "agricultural roads". For example, it is preferred that among the "agricultural roads" defined as above, an agricultural road that is not well maintained as compared with a general road, for example, an unpaved agricultural road, a narrow agricultural road or the like can be distinguished from a general road.

In addition, the agricultural road identification system according to the present example embodiment has an advantage of being capable of adjusting the criterion for identification as an agricultural road, in accordance with the type of the agricultural machine (in the case where the agricultural machine has an implement attached thereto, also in accordance with the type of the implement). Alternatively, the agricultural road identification system can adjust the criterion for identification as an agricultural road, in accordance with the characteristics of the agricultural machine or the implement (e.g., the width, the height, the weight, the horsepower, etc.).

The agricultural road identification system according to the present example embodiment identifies whether a road is an agricultural road or not by use of characteristics of the external appearance of the road, specifically, based on information on the transverse profile of the ground on which the agricultural machine is to travel and also based on information on the surrounding environment of the agricultural machine. Therefore, the agricultural road identification system can appropriately adjust the criterion for identification as an agricultural road as needed. The agricultural road identification system may be configured such that the user can change the criterion for identification as an agricultural road by operating the operational terminal 200 or the terminal device 400.

The agricultural road identification system according to the present example embodiment may be configured so as to perform an operation of identifying whether a road is an agricultural road or not at the time of, for example, local path planning. The controller 180 may perform the local path planning and the identification on whether a road is an agricultural road or not in parallel to each other, or may identify whether a road is an agricultural road or not before the local path planning. When determining that the road on which the work vehicle 100 is to travel is an agricultural road, the controller 180 may set a local path for the work vehicle 100 based on the sensing data on the ground on which the work vehicle 100 is to travel and also based on the sensing data on the surrounding environment of the work vehicle 100. For example, when determining that the road on which the work vehicle 100 is to travel is an agricultural road, the controller 180 may set waypoints at an appropriate position on the agricultural road (e.g., at the center in the transverse direction or in the vicinity thereof) to set a local path. When determining that the road on which the work vehicle 100 is to travel is an agricultural road, the controller 180 may detect the width of the travelable region (e.g., the width of the region in the transverse direction) of the road on which the work vehicle 100 is to travel, based on the sensing data on, and/or the transverse profile of, the ground on which the work vehicle 100 is to travel. The travelable region may be set, for example, with an obstacle on the road being avoided. In addition to the obstacle, a region where the work vehicle 100 preferably avoids traveling such as, for example, a region with large protrusions and recesses, a large step, a muddy spot or the like may be excluded to set the travelable region. The controller 180 may detect a rut(s) formed in the ground (that is, tire tracks) based on the sensing data on the ground on which the work vehicle 100 is to travel. The rut is formed as, for example, a recess (concaved portion) extending in the direction in which the road extends. When detecting the rut, the controller 180 may set a local path along the rut. When detecting two ruts in the ground, the controller 180 may compare the distance between the ruts with the distance between the two front wheels 104F. In the case where the difference between the distances is negligibly small, the controller 180 may set a local path such that the front wheels 104F travel on the ruts. In the case where the difference between the distances is large, the controller 180 may set a local path such that the front wheels 104F travel while avoiding the ruts.

When determining that the road on which the work vehicle 100 is to travel is an agricultural road, the controller 180 may detect at least one characteristic point among the entrance/exit of the field, a ditch, and the agricultural facility from the sensing data on the surrounding environment of the work vehicle 100, and may use the characteristic point to set a landmark on the path for the work vehicle 100. The set landmark may be used for localization.

The controller 180 may cause information, representing the results of the identification on whether a road is an agricultural road or not, to be reflected on the map. For example, the controller 180 may add attribute information, indicating that a specific road in an existing map is an agricultural road, to the map. In the case where the position or the width of the agricultural road in an existing map is incorrect, the controller 180 may correct the position or the width of the agricultural road in the existing map based on the information on the position and the width of the identified agricultural road.

The controller 180 may further use information on the degree of vibration of the work vehicle 100 (may be referred to as "third information") to identify whether a road is an agricultural road or not. For example, the controller 180 can acquire information on the degree of vibration of the work vehicle 100 (e.g., the frequency characteristics (number of vibrations) of the vibration waveform, vibration acceleration, etc. of the work vehicle 100) based on a signal output from the sensor to sense the vibration of the work vehicle 100 (e.g., an acceleration sensor included in the work vehicle 100). The controller 180 may acquire, for example, a vibration waveform from the acceleration sensor of the work vehicle 100 and perform filtering to remove a component derived from anything other than the protrusions and recesses of the ground (e.g., to remove the acceleration, etc. of the work vehicle 100). Such filtering allows the vibration waveform to be used to evaluate the protrusions and recesses of the ground. For the filtering, machine learning may be used.

When determining that a road on the ground on which the work vehicle 100 is to travel is an agricultural road, the controller 180 may further determine whether it is possible for the work vehicle 100 to travel on the road or not, based on the width and/or the length of the work vehicle 100. The work vehicle 100 provided as an example herein is a tractor to which an implement is attachable. In the case where the work vehicle 100 has an implement attached thereto, the controller 180 can determine whether it is possible for the work vehicle 100 to travel on the road or not, based on the width and/or the length of the attached implement. The width and/or the length of the work vehicle 100 is recorded in, for example, the recording device 170 of the work vehicle 100. The width and the length of the implement attached to the work vehicle 100 are also recorded in, for example, the recording device 170 of the work vehicle 100. The width and the length of the implement may be automatically recognized and recorded when the implement is connected to the work vehicle 100.

The controller 180 can change the method for controlling the work vehicle 100 based on the results of identification on whether a road on the ground on which the work vehicle 100 is to travel is an agricultural road or not. For example, the controller 180 may control the drive device 240 by different methods between when the road on which the work vehicle 100 is to travel is identified as being an agricultural road and when the road on which the work vehicle 100 is to travel is identified as not being an agricultural road. For example, when the road on which the work vehicle 100 is to travel is identified as being an agricultural road, the controller 180 may set the speed of the work vehicle 100 to be lower than when the road on which the work vehicle 100 is to travel is identified as not being an agricultural road.

When determining that the work vehicle 100 is not possible to travel on the road, the controller 180 halts the travel of the work vehicle 100. When determining that the work vehicle 100 is not possible to travel on the road, the controller 180 may notify the computer performing remote monitoring of the work vehicle 100 that the work vehicle 100 is not possible to travel on the road. For example, the controller 180 may transmit a signal to the terminal device 400 to notify the user performing remote monitoring of the work vehicle 100. The user can perform remote operation of the work vehicle 100 via, for example, the terminal device 400.

Figure 11:
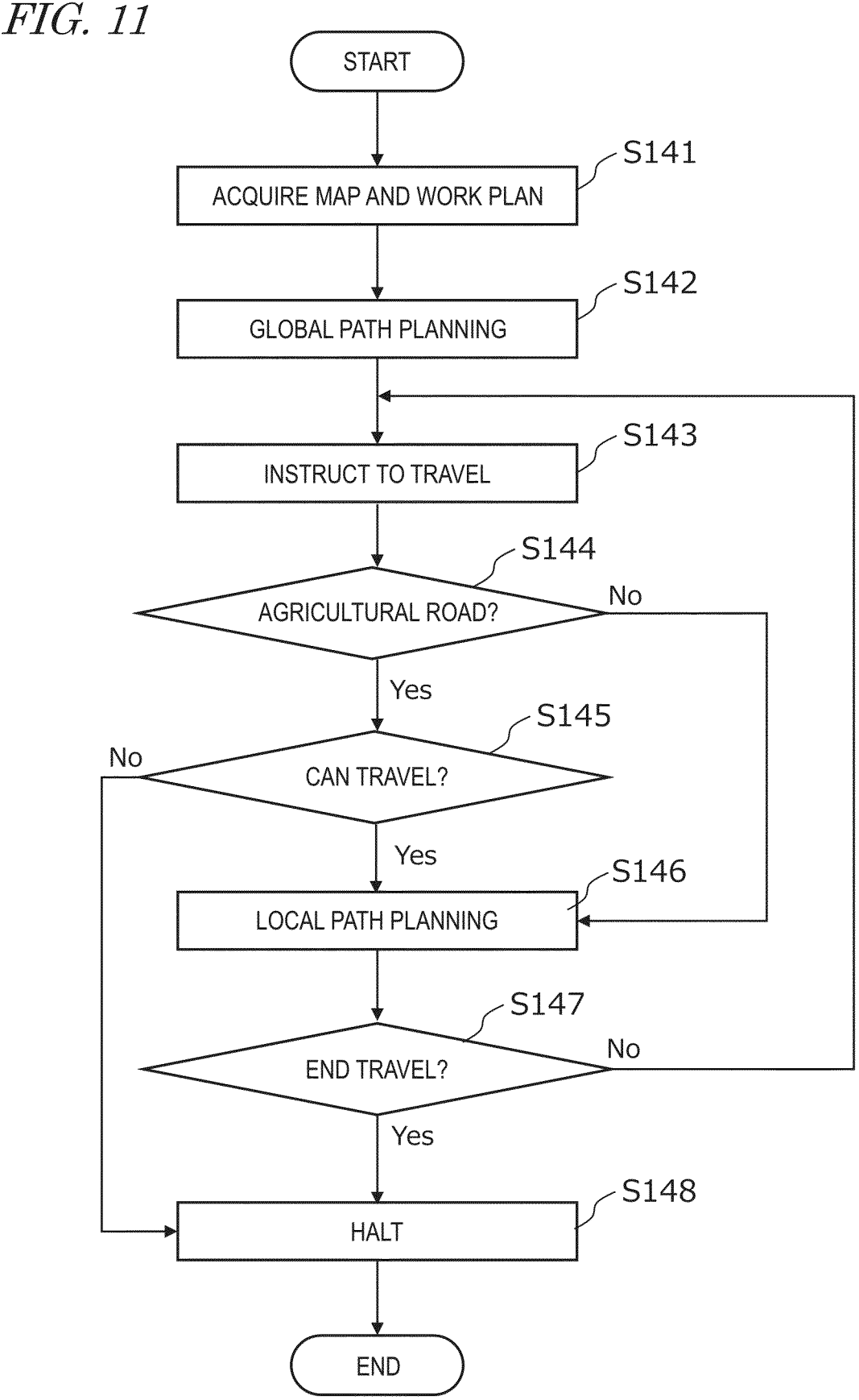
FIG. 11 is a flowchart showing an example method for path planning and travel control performed by use of an agricultural road identification system.

FIG. 11 is a flowchart showing an example operation of path planning and travel control performed by use of the agricultural road identification system according to the present example embodiment. In the example shown in FIG. 11, it is identified whether a road is an agricultural road or not before the local path planning.

In the example shown in FIG. 11, the management device 600 first acquires a map and a work plan from the storage device 650 (step S141). Next, the management device 600 performs global path planning for the work vehicle 100 based on the map and the work plan by the above-described method (step S142). The global path planning may be performed at any timing before the work vehicle 100 begins to travel. The global path planning may be performed immediately before the work vehicle 100 begins to travel, or the day before the work vehicle 100 begins to travel or even earlier. The global path may be generated based on information input by the user by use of the terminal device 400 (e.g., based on the departure point, the target point, the waypoints, etc.). The management device 600 transmits the data representing the generated global path to the work vehicle 100. After this, the management device 600 gives the work vehicle 100 a command to travel, at a predetermined timing. Upon receipt of the command, the controller 180 of the work vehicle 100 controls the drive device 240 to begin the travel of the work vehicle 100 (step S143). This causes the work vehicle 100 to begin traveling. The timing when the work vehicle 100 begins traveling may set to, for example, such an appropriate timing as to allow the work vehicle 100 to arrive at the field before the time when the first task of agricultural work is to begin on each working day indicated by the work plan. During travel of the work vehicle 100, the ECU 185 of the controller 180 identifies whether the road on which the work vehicle 100 is to travel is an agricultural road or not (step S144). When determining that the road is an agricultural road, the ECU 185 of the controller 180 determines whether it is possible for the work vehicle 100 to travel on the road or not (step S145). When determining that it is possible for the work vehicle 100 to travel on the road, the ECU 185 of the controller 180 performs local path planning to avoid collision against an obstacle by a method described below (step S146). When the identification on whether the road is an agricultural road or not (step S144) results in a determination that the road is not an agricultural road, the ECU 185 of the controller 180 may perform local path planning (step S146) without determining whether it is possible for the work vehicle 100 to travel on the road or not (step S145). In the case where no obstacle is detected, the ECU 185 generates a local path parallel or substantially parallel to the global path. In the case where an obstacle is detected, the ECU 185 generates a local path along which the obstacle is avoidable. Next, the ECU 184 determines whether or not to end the travel of the work vehicle 100 (step S147). In the case where, for example, a local path along which the obstacle is avoidable cannot be generated, or in the case where the work vehicle 100 has arrived at the target point, the ECU 184 halts the work vehicle 100 (step S148). Also when it is determined that the work vehicle 100 is not possible to travel on the road, the ECU 184 halts the work vehicle 100 (step S148). In the case where no obstacle is detected, or in the case where a local path along which the obstacle is avoidable is generated, the operation returns to step S143. After this, the operation in steps S143 to S148 is repeated until it is determined in step S148 to end the travel.

During travel of the work vehicle 100, the controller 180 may identify whether the road on which the work vehicle 100 is to travel is an agricultural road or not at a predetermined timing. For example, the controller 180 may acquire a vibration waveform from the acceleration sensor of the work vehicle 100, perform filtering to remove a component derived from anything other than the protrusions and recesses of the ground (e.g., to remove the acceleration, etc. of the work vehicle 100), and evaluate the degree of vibration (frequency characteristics of vibration, etc.) based on the acquired vibration waveform. The controller 180 may determine whether an index value representing the degree of vibration is larger than a predetermined value or not, and identify whether the road on which the work vehicle 100 is to travel is an agricultural road or not by use of, as a trigger, the degree of vibration being larger than the predetermined value.

An example to which the agricultural road identification system is applicable is not limited to the example shown in FIG. 11. For example, the work plan does not need to be used to set a global path. The agricultural road identification system may be used to create a map including information on whether the road is an agricultural road or not.

Figure 12:
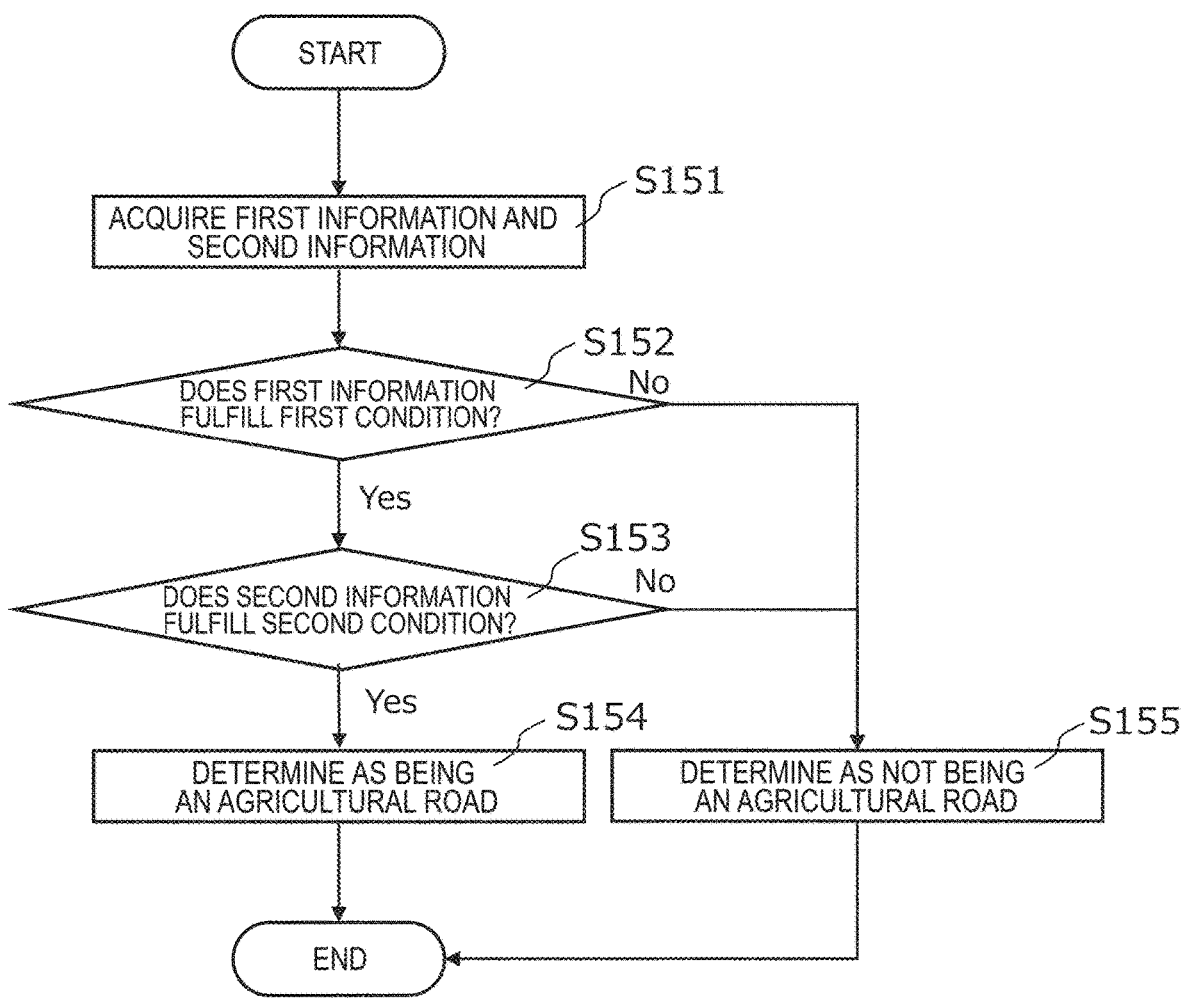
FIG. 12 is a flowchart showing an example method for identifying whether a road is an agricultural road or not.

FIG. 12 is a flowchart showing an example method for identifying whether a road is an agricultural road or not. In this example, the controller 180 determines that the road on which the work vehicle 100 is to travel is an agricultural road in the case where the information on the transverse profile of the ground on which the work vehicle 100 is to travel (first information) fulfills at least one first condition and the information on the surrounding environment of the work vehicle 100 (second information) fulfills at least one second condition. The controller 180 acquires the first information and the second information (step S151). The controller 180 determines whether the first information fulfills the first condition or not (step S152). When determining that the first information fulfills the first condition, the controller 180 determines whether the second information fulfills the second condition or not (step S153). When determining that the second information fulfills the second condition, the controller 180 determines that the road is an agricultural road (step 154). When determining that the first information does not fulfill the first condition, or when determining that the second information does not fulfill the second condition, the controller 180 determines that the road is not an agricultural road (step S155).

The method is not limited to the example shown in FIG. 12. For example, the controller 180 may acquire the second information only when determining that the first information fulfills the first condition. The determination on whether the first information fulfills the first information or not (step S152) and the determination on whether the second information fulfills the second information or not (step S153) may be performed in an opposite order.

Figure 13A:
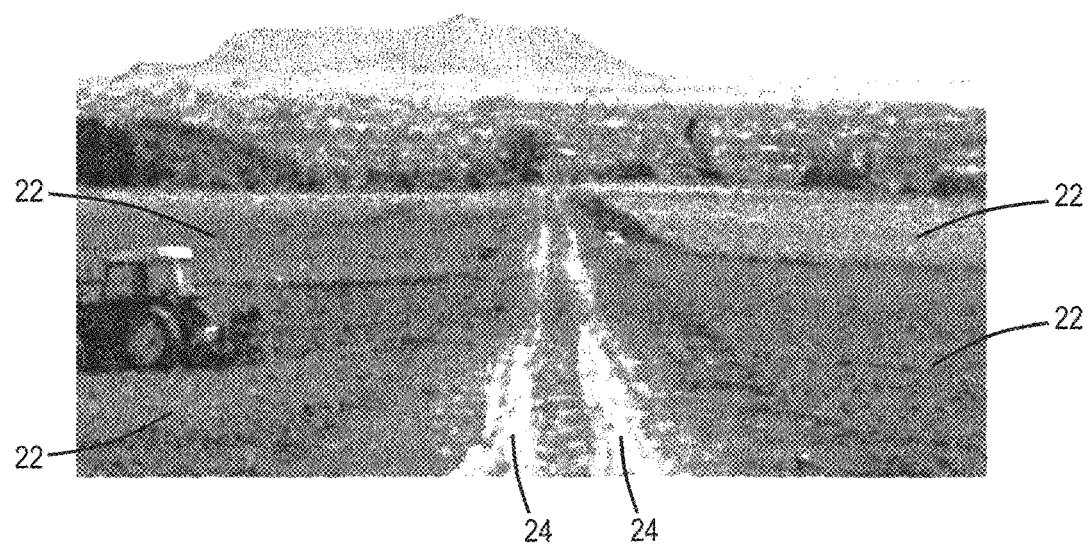
FIG. 13A shows a monochrome image corresponding to an example of image acquired by a camera of the work vehicle.
Figure 13B:
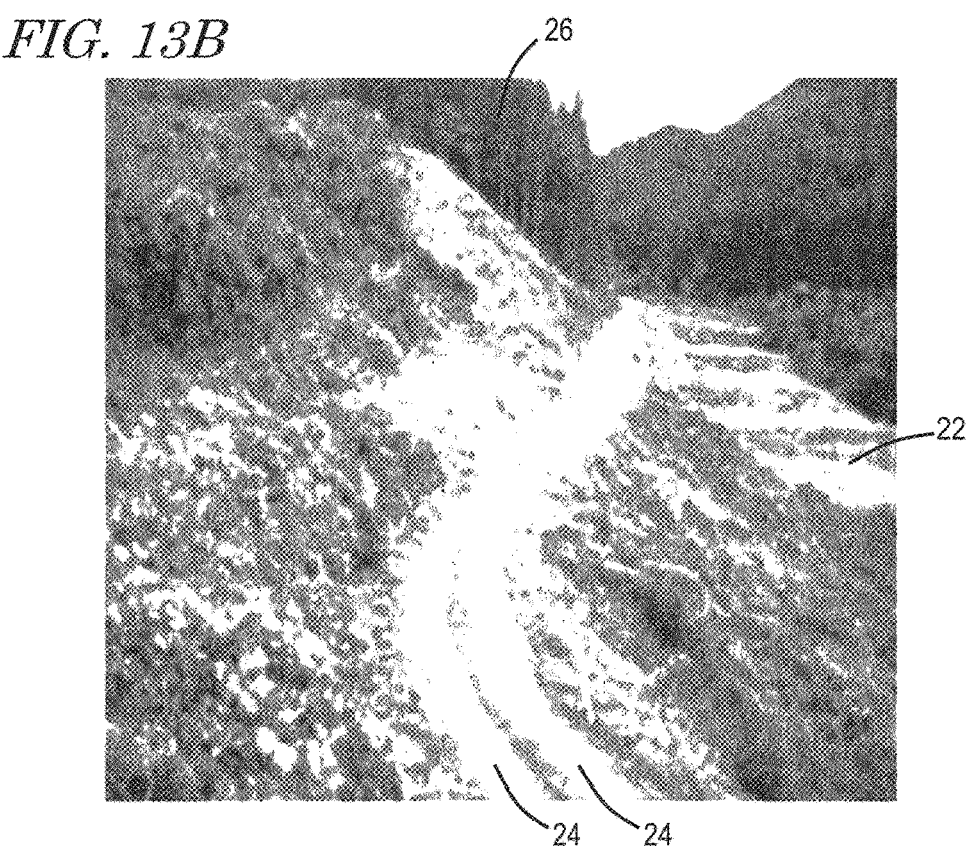
FIG. 13B shows a monochrome image corresponding to an example of image acquired by the camera of the work vehicle.

Specific examples of conditions for determining whether a road is an agricultural road or not will be described with reference to FIG. 13A and FIG. 13B. FIG. 13A and FIG. 13B are each a monochrome image corresponding to an image acquired by the camera 120 of the work vehicle 100. These figures each show, as an example, an image including the ground on which the work vehicle 100 is to travel and the surrounding environment of the work vehicle 100. The controller 180 can identify whether the road is an agricultural road or not under, for example, any of the conditions described below as examples. The conditions described below may be combined for use. The first condition includes, for example, a condition reflecting that the rut extending in the direction in which the road extends is formed in the ground in which the work vehicle 100 is to travel. For example, in each of FIG. 13A and FIG. 13B, two ruts 24 extending in the direction in which the road extends are formed. The two ruts 24 extend parallel or substantially parallel to each other. Between the two ruts 24, a protrusion extending in the direction in which the road extends may be formed. In an unpaved agricultural road shown in each of FIG. 13A and FIG. 13B, such ruts can be formed. In addition, grass may grow on or along the protrusion between the two ruts. Such a rut may be detected as one of characteristics of the agricultural road and used as a condition for identifying whether the road is an agricultural road or not.

Specifically, the first condition includes a condition that, for example, a plurality of continuous transverse profiles respectively include portions, each representing a recess, at positions corresponding to each other. The first condition may include, for example, a condition that a plurality of continuous transverse profiles respectively include portions, each representing two recesses, at positions corresponding to each other. After such recesses are detected from the plurality of continuous transverse profiles, the controller 180 may further determine whether the detected recesses are classified as ruts or not. The determination on whether the recesses are classified as ruts or not may use, for example, image data of the ground.

The first condition may further include a condition that a protrusion is formed between the two recesses. The first condition may further include a condition that grass grows on or along the protrusion. The grass may be detected by, for example, detecting green pixels by use of RGB values of color image data of the ground acquired by the camera 120. An RGB color space may be converted into an HSV color space, and the HSV color space may be used to detect the green pixels. The HSV color space is a color space formed of three components of hue, saturation and value. For detecting green pixels, the range of hue may be set to, for example, 30 to 90.

Another example of the first condition may include, for example, a condition that the gradient (inclination) of the ground in a direction crossing the direction in which the road extends is larger than a predetermined value. For example, in FIG. 13B, a grove 26 is on one side of the road. In this case, the road may incline at a large angle in a direction crossing the direction in which the road extends. The first condition includes, for example, a condition that the inclination of the transverse profile of the ground is larger than a predetermined value.

The first condition may include a condition on the roughness of the road. For example, as an index for evaluating the protrusions and recesses of a paved road in a longitudinal direction, an IRI (International Roughness Index) is used. It is possible that an unpaved agricultural road has protrusions and recesses larger than those of a general road in the longitudinal direction. The controller 180 may acquire a longitudinal profile of the road, find the IRI from the longitudinal profile and evaluate the degree of protrusion and recess (roughness) of the road. The first condition may include a condition that the degree of protrusion and recess of the road is larger than a predetermined value.

The second condition includes, for example, a condition that there is at least one of a field, a footpath between fields, a grove and plants adjacent to, and on both of two sides or one side of, the road. Existence of either one of a field, a footpath between fields, a grove and plants adjacent to the road is detected as one of characteristics of the agricultural road and used as one condition for identifying whether the road is an agricultural road or not. In, for example, FIG. 13A, fields 22 exist adjacent to, and on both of two sides of, the road. In the example shown in FIG. 13B, a field 22 exists adjacent to, and on one side of, the road. For example, the controller 180 detects the road from the sensing data acquired by sensing the surrounding environment of the work vehicle 100, recognizes an object existing adjacent to, and on both of two sides or one side of, the road, and identifies the type of the recognized object.

Figure 13C:
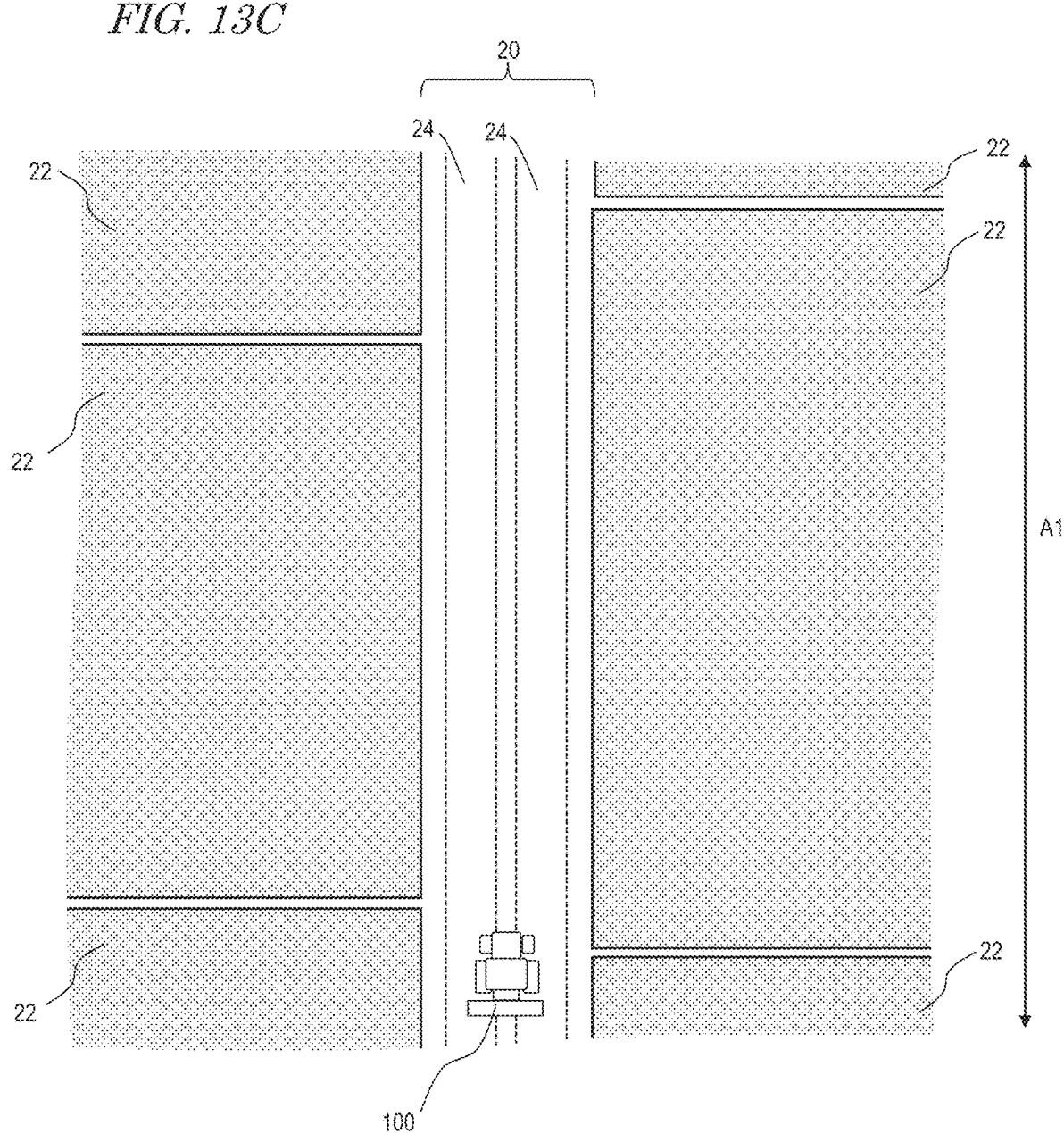
FIG. 13C is a plan view schematically showing an example in which the work vehicle is automatically traveling outside fields while agricultural road using the identification system.
Figure 13D:
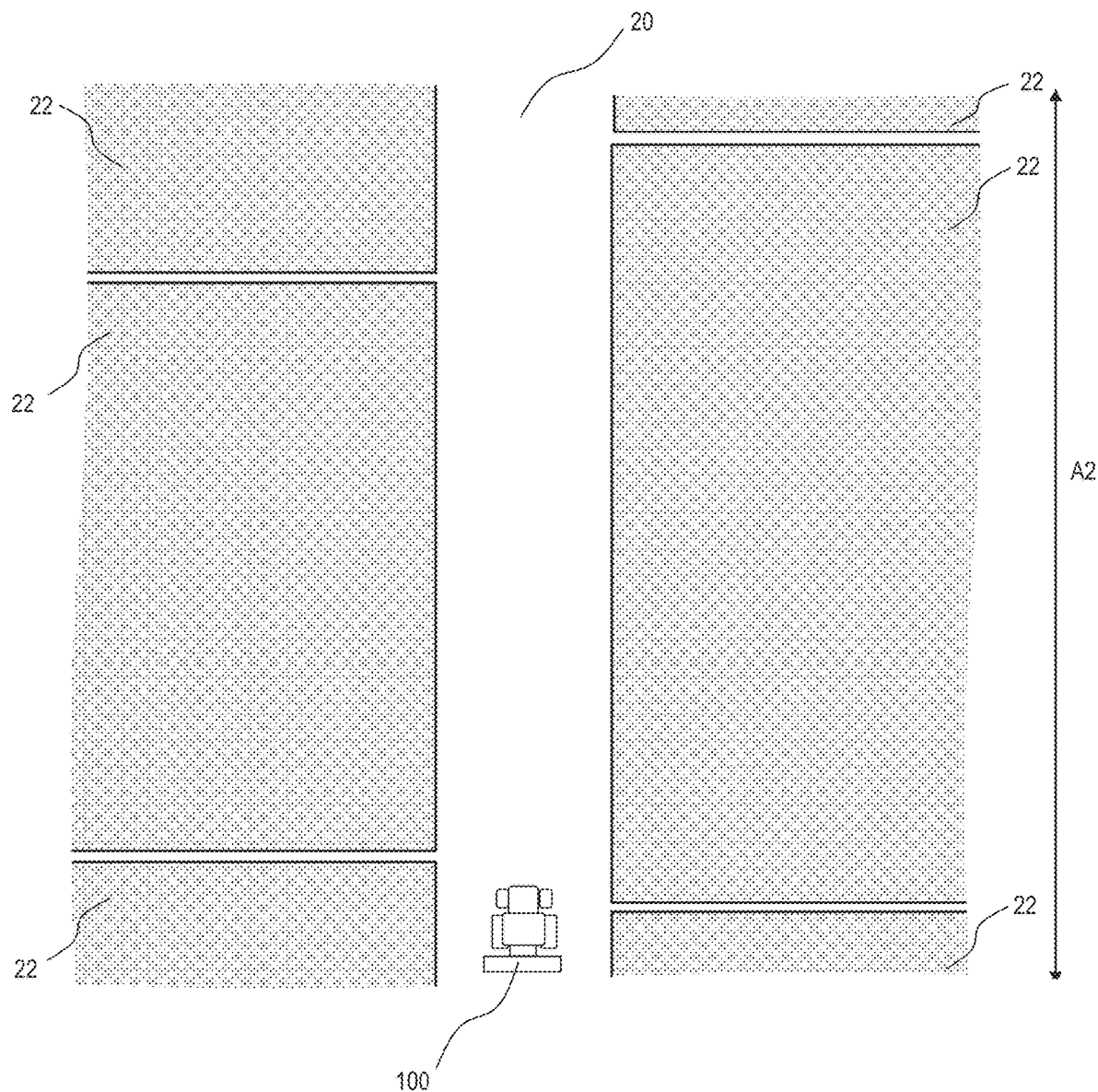
FIG. 13D is a plan view schematically showing an example in which the work vehicle is automatically traveling outside fields while using the agricultural road identification system.
Figure 13E:
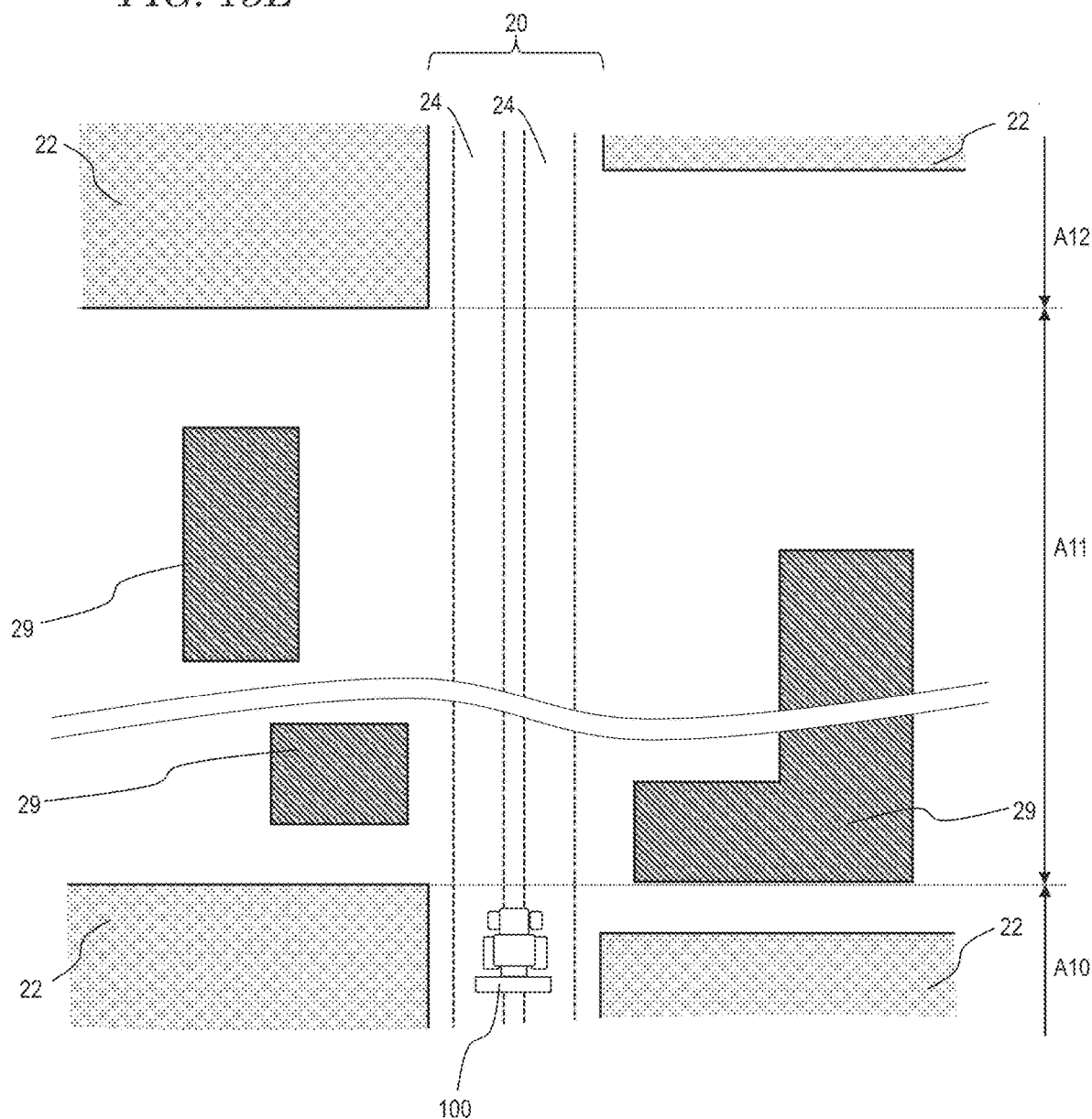
FIG. 13E is a plan view schematically showing an example in which the work vehicle is automatically traveling outside fields while using the agricultural road identification system.

FIG. 13C, FIG. 13D and FIG. 13E are each a plan view schematically showing an example in which the work vehicle 100 is automatically traveling on a road 20 outside fields while using the agricultural road identification system according to the present example embodiment.

As shown in FIG. 13C, in a zone A1 of the road 20, two ruts 24 extending in the direction in which the road 20 extends (in this example, the up-down direction of the figure) are formed, and fields 22 exist adjacent to, and on both of two sides of, the road 20. In this example, it is assumed that the controller 180 identifies whether the road 20 is an agricultural road or not by the method shown in the flowchart in FIG. 12. In the zone A1 of the road 20, the first information fulfills the first condition and the second information fulfills the second condition. Therefore, the controller 180 determines that the road 20 is an agricultural road. By contrast, in FIG. 13D, in a zone A2 of the road 20, no protrusions or recesses corresponding to the ruts are formed in the ground on which the work vehicle 100 is to travel, and the fields 22 exist adjacent to, and on both of two sides of, the road 20. As can be seen, in the zone A2 of the road 20, the second information fulfills the second condition but the first information does not fulfill the first condition. Therefore, the controller 180 determines that the road 20 is not an agricultural road.

Figure 13F:
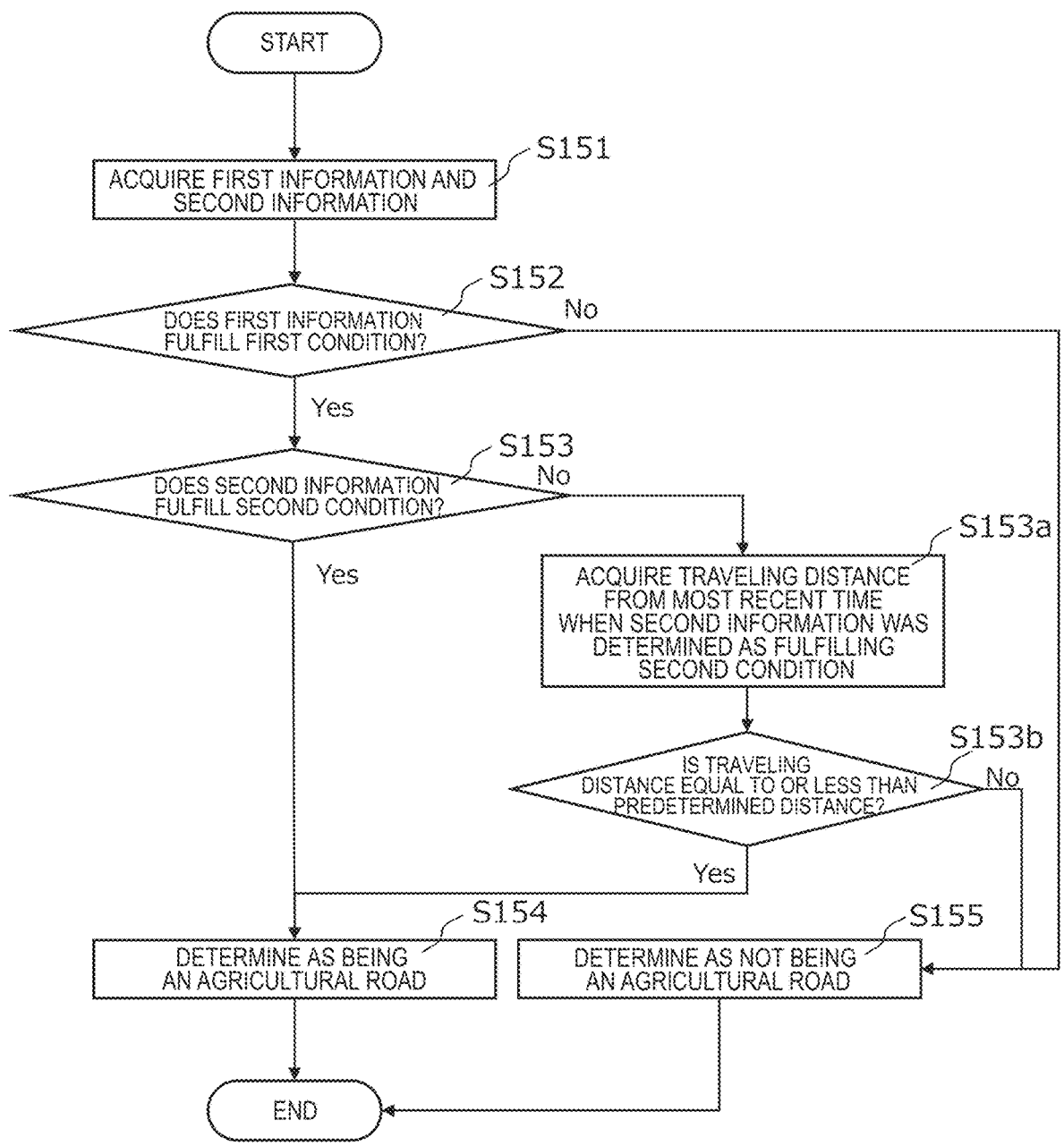
FIG. 13F is a flowchart showing an example method for identifying whether a road is an agricultural road or not.

The method for identifying whether a road is an agricultural road or not is not limited to the example described above. Another example of the method for identifying whether a road is an agricultural road or not will be described with reference to FIG. 13E and FIG. 13F. FIG. 13F is a flowchart showing another example of method for identifying whether a road is an agricultural road or not. Differences from the flowchart in FIG. 12 will be mainly described.

For example, as shown in FIG. 13E, in zones A10, A11 and A12 of the road 20 that are continuous to each other, two ruts 24 extending in the direction in which the road 20 extends are formed. In each of the zones A10 and A12 of the road 20, a field 22 exists adjacent to, and on at least one side of, the road 20. The first information fulfills the first condition and the second information fulfills the second condition. Therefore, the controller 180 determines that the road 20 is an agricultural road. By contrast, in the zone A11 continuous to the zone A10, none of a field, a footpath between fields, a grove or plants exists on either side of the road 20 adjacently thereto. Here, instead, structural bodies (building) 29 exist. In the zone A11, the first information fulfills the first condition but the second information does not fulfill the second condition. In this case, the controller 180 refers to the distance the work vehicle 100 traveled after the most recent time when the road 20 was determined as being an agricultural road for the zone A10 before the zone A11 (step S153a), and determines whether or not the distance referred to is equal to or less than a predefined distance (e.g., equal to or less than 100 m) (step S153b). In the case where the distance referred to is equal to or less than the predefined distance, the controller 180 determines that the road 20 is an agricultural road. That is, in the case where a state where the first information fulfills the first condition and the second information fulfills the second condition is changed to a state where the first information fulfills the first condition but the second information does not fulfill the second condition, the controller 180 determines that the road is an agricultural road as long as the distance the work vehicle 100 traveled in a state where the second information did not fulfill the second condition is equal to or less than the predetermined distance.

The management device 600 generates a global path, and the information on the generated global path is transmitted to the work vehicle 100 and stored in the storage device 170. The ECU 184, performing self-driving control, controls the ECUs 181 and 182 such that the work vehicle 100 travels along the global path. This allows the work vehicle 100 to begin traveling along the global path.

There may be a case where while the work vehicle 100 is traveling outside the field, there is an obstacle such as a pedestrian or another vehicle on the global path or in the vicinity thereof. In order to avoid the work vehicle 100 colliding against the obstacle, while the work vehicle 100 is traveling, the ECU 185 of the controller 180 consecutively generates a local path along which the work vehicle 100 can avoid the obstacle. While the work vehicle 100 is traveling, the ECU 185 generates a local path based on sensing data acquired by the sensor included in the work vehicle 100 (the obstacle sensors 130, the LiDAR sensor 140, the cameras 120, etc.). The local path is defined by a plurality of waypoints along a portion of the global path. Based on the sensing data, the ECU 185 determines whether or not there is an obstacle existing on the road on which the work vehicle 100 is proceeding or in the vicinity thereof. In the case where there is such an obstacle, the ECU 185 sets a plurality of waypoints such that the obstacle is avoided, and thus generates a local path. In the case where there is no such obstacle, the ECU 185 generates a local path parallel or substantially parallel to the global path. Information representing the generated local path is transmitted to the ECU 184 responsible for self-driving control. The ECU 184 controls the ECU 181 and the ECU 182 such that the work vehicle 100 travels along the local path. This allows the work vehicle 100 to travel while avoiding the obstacle. In the case where there is a traffic signal on the road on which the work vehicle 100 is traveling, the work vehicle 100 may recognize the traffic signal based on, for example, an image captured by the cameras 120 and perform an operation of halting at a red light and moving forward at a green light.

Figure 14:
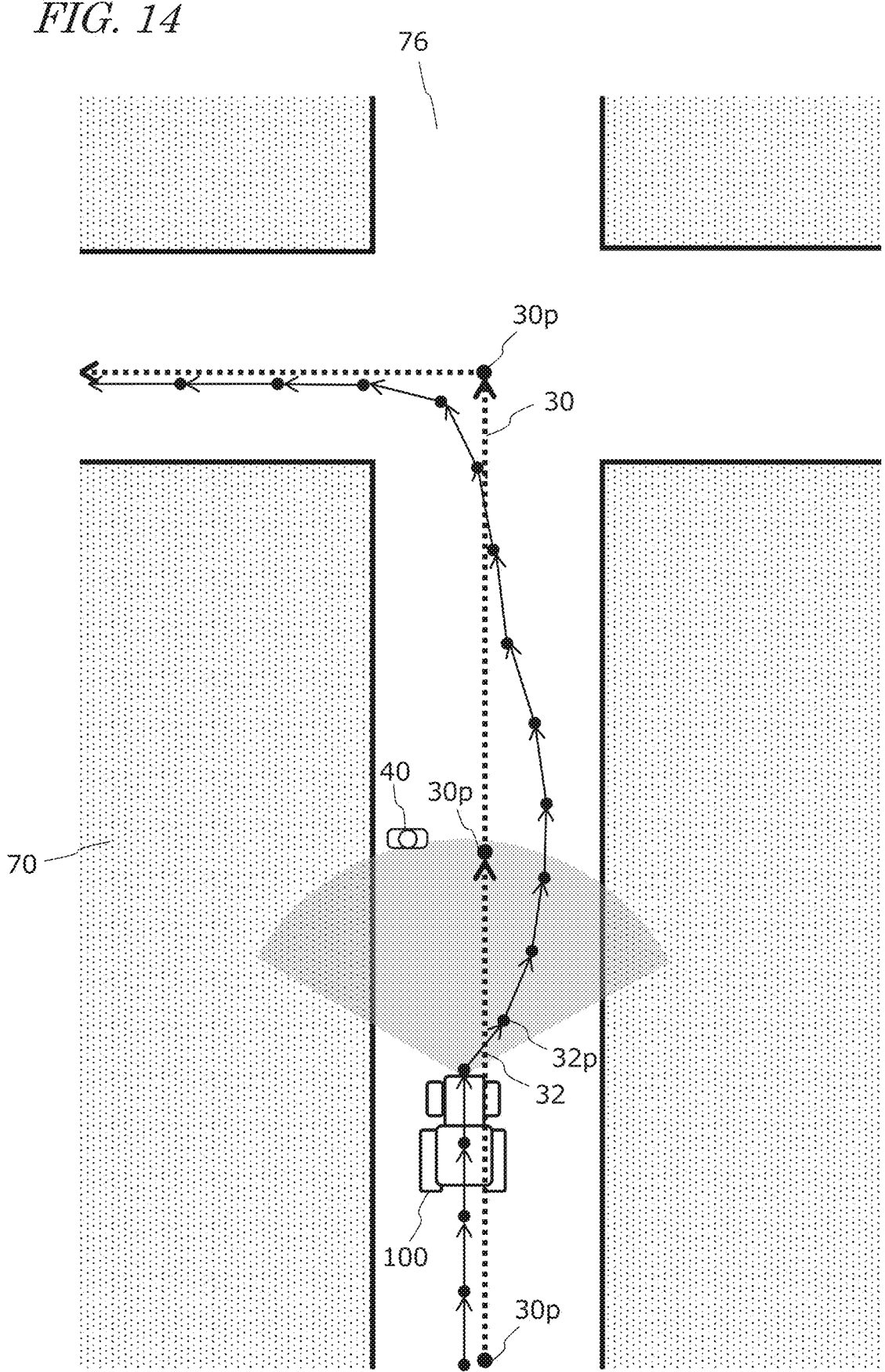
FIG. 14 is a diagram showing an example of global path and an example of local path generated in an environment where there is an obstacle.

FIG. 14 is a diagram showing an example of global path and an example of local path generated in an environment where there is an obstacle. FIG. 14 represents, as an example, a global path 30 by the broken line arrows, and represents, as an example, local paths 32 consecutively generated during travel of the work vehicle 100 by the solid line arrows. The global path 30 is defined by a plurality of waypoints 30p. The local paths 32 are defined by a plurality of waypoints 32p set at a shorter interval than the waypoints 30p. The waypoints each have information on, for example, the position and the orientation. The management device 600 sets the plurality of waypoints 30p at a plurality of points including an intersection of the roads 76 to generate the global path 30. The interval between the waypoints 30p is relatively long, and may be, for example, about several meters to about several tens of meters. The ECU 185 sets the plurality of waypoints 32p based on the sensing data output from the sensor during travel of the work vehicle 100 to generate the local paths 32. The interval between the waypoints 32p of the local paths 32 is shorter than the interval between the waypoints 30p of the global path 30. The interval between the waypoints 32p may be, for example, about several tens of centimeters (cm) to about several meters (m). The local paths 32 are generated in a relatively small range (e.g., a range of about several meters) from the position of the work vehicle 100. FIG. 14 shows, as an example, a series of local paths 32 generated while the work vehicle 100 travels along the road 76 between the fields 70 and turns left at the intersection. While the work vehicle 100 is moving, the ECU 185 repeats an operation of generating a local path from the position of the work vehicle 100 estimated by the ECU 184 to, for example, a point frontward of the work vehicle 100 by several meters. The work vehicle 100 travels along the local paths consecutively generated.

In the example shown in FIG. 14, there is an obstacle 40 (e.g., a human) frontward of the work vehicle 100. FIG. 14 shows a fan-shaped region as an example of range sensed by the sensors such as the cameras 120, the obstacle sensors 130 or the LiDAR sensor 140 mounted on the work vehicle 100. In such a state, the ECU 185 generates the local paths 32 such that the obstacle 40 detected based on the sensing data is avoided. The ECU 185 determines whether or not there is a possibility that the work vehicle 100 will collide against the obstacle 40, based on, for example, the sensing data and the width of the work vehicle 100 (including the width of the implement in the case where the implement is attached). In the case where there is a possibility that the work vehicle 100 will collide against the obstacle 40, the ECU 185 sets the plurality of waypoints 32p such that the obstacle 40 is avoided, and generates the local paths 32. Note that the ECU 185 may recognize the state of the road surface (e.g., being muddy, having a cave-in, etc.) based on the sensing data, in addition to the presence/absence of the obstacle 40, and in the case where a site on which it is difficult to travel is detected, may generate the local paths 32 such that the local paths 32 avoid such a site. The work vehicle 100 travels along the local paths 32. In the case where the obstacle 40 cannot be avoided in whichever manner the local paths 32 may be set, the controller 180 may halt the work vehicle 100. At this point, the controller 180 may transmit an alert signal to the terminal device 400 to warn a supervisor. In the case where after the work vehicle 100 halts, the obstacle 40 is moved and it is recognized that there is no risk of collision, the controller 180 may restart the travel of the work vehicle 100.

In the example of the flowchart in FIG. 11, the global path, once generated, is not changed until the work vehicle 100 arrives at the target point. The global path is not limited to this, and may be modified while the work vehicle 100 is traveling. For example, the ECU 185 may recognize at least one of: the state of the road on which the work vehicle 100 is traveling, the state of the plants in the surroundings of the work vehicle 100, and the state of weather, based on the sensing data acquired by the sensors such as the cameras 120 or the LiDAR sensor 140 while the work vehicle 100 is traveling, and in the case where the recognized state fulfills a predetermined condition, may change the global path. There is a case where while the work vehicle 100 is traveling along the global path, a portion of the road along the global path is difficult to pass along. For example, there is a case where the road is muddy due to a heavy rain, the road surface has a cave-in, or it is impossible to pass along the road due to an accident or any other reason. Alternatively, there is a case where a satellite signal from a GNSS satellite is difficult to be received for the reason that the plants around the agricultural road have grown more than expected or that a new building has been built. In consideration of such a situation, the ECU 185 may detect a road that is difficult to pass along, based on the sensing data acquired during travel of the work vehicle 100 and may change the path such that the post-change path avoids such a road. In the case where the path is changed, the ECU 185 may cause the storage device 170 to store the post-change path and may transmit information on the post-change path to the management device 600. In this case, the next time a path to the same field is to be generated, the management device 600 may adopt the post-change path. This allows the path planning to be performed flexibly in accordance with a change in the environment.

The agricultural road identification systems according to the above-described example embodiments can be mounted on agricultural machines lacking such functions, as an add-on. Such a system may be manufactured and marketed independently from the agricultural machine. A computer program for use in such a system may also be manufactured and marketed independently from the agricultural machine. The computer program may be provided in a form stored in a non-transitory computer-readable storage medium, for example. The computer program may also be provided through downloading via telecommunication lines (e.g., the Internet).

The techniques according to the present disclosure are applicable to agricultural road identification systems for agricultural machines, such as tractors, harvesters, rice transplanters, vehicles for crop management, vegetable transplanters, mowers, seeders, spreaders, or agricultural robots, for example. The agricultural road identification systems according to example embodiments of the present disclosure may be used while, for example, the agricultural machines are performing self-traveling outside the field.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An agricultural road identification system for an agricultural machine performing self-driving, the agricultural road identification system comprising:
   at least one sensor to sense a ground on which the agricultural machine is to travel, to acquire a first sensing data, and to sense a surrounding environment of the agricultural machine to acquire a second sensing data; and
   a processor configured or programmed to acquire a first information on a transverse profile of the ground based on the first sensing data, to acquire a second information on the surrounding environment based on the second sensing data, and to identify whether a road on the ground is an agricultural road or not based on the first information and the second information.

2. The agricultural road identification system of claim 1, wherein the processor is configured or programmed to recognize one or a plurality of objects existing around the agricultural machine based on the second sensing data, and acquire the second information including results of the recognition.

3. The agricultural road identification system of claim 1, wherein the processor is configured or programmed to determine that the road is an agricultural road when the first information fulfills a first condition and the second information fulfills a second condition.

4. The agricultural road identification system of claim 3, wherein when at least one of a field, a footpath between fields, a grove or plants adjacent to, or on both of two sides or one side of, the road is recognized based on the second sensing data, the processor is configured or programmed to determine that the second condition is fulfilled.

5. The agricultural road identification system of claim 4, wherein
   the at least one sensor includes a LiDAR sensor and/or a camera;
   the second sensing data includes point cloud data of the surrounding environment acquired by the LiDAR sensor and/or image data of the surrounding environment acquired by the camera; and
   the processor is configured or programmed to detect the road, and also detect at least one of a field, a footpath between fields, a grove or plants adjacent to, or on both of two sides or one side of, the road, from the second sensing data.

6. The agricultural road identification system of claim 3, wherein when a rut in the ground and extending in a direction in which the road extends is detected based on the first information, the processor is configured or programmed to determine that the first condition is fulfilled.

7. The agricultural road identification system of claim 3, wherein when it is detected based on the first information that the transverse profile of the ground has a protrusion at a center and that the protrusion extends in a direction in which the road extends, the processor is configured or programmed to determine that the first condition is fulfilled.

8. The agricultural road identification system of claim 7, wherein when it is detected based on the first information that grass grows on or along the protrusion, the processor is configured or programmed to determine that the first condition is fulfilled.

9. The agricultural road identification system of claim 8, wherein
   the at least one sensor includes a camera;
   the first sensing data includes color image data of the ground acquired by the camera; and
   the processor is configured or programmed to detect the grass growing on or along the protrusion, based on RGB values of the color image data of the ground.

10. The agricultural road identification system of claim 3, wherein when it is detected based on the first information that the ground has an inclination larger than a predetermined value, the processor is configured or programmed to determine that the first condition is fulfilled.

11. The agricultural road identification system of claim 1, wherein
    the at least one sensor includes a LiDAR sensor and/or a camera;
    the first sensing data includes point cloud data of the ground acquired by the LiDAR sensor and/or image data of the ground acquired by the camera; and
    the second sensing data includes point cloud data of the surrounding environment acquired by the LiDAR sensor and/or image data of the surrounding environment acquired by the camera.

12. The agricultural road identification system of claim 1, wherein when determining that the road is an agricultural road, the processor is configured or programmed to determine whether it is possible for the agricultural machine to travel on the road or not, based on a width and/or a length of the agricultural machine.

13. The agricultural road identification system of claim 12, wherein when determining that the agricultural machine is not possible to travel on the road, the processor is configured or programmed to notify a monitoring computer of the agricultural machine that the agricultural machine is not possible to travel on the road.

14. The agricultural road identification system of claim 1, wherein
    the agricultural machine is a tractor to which an implement is attachable; and
    when determining that the road is an agricultural road in a state where the tractor has the implement attached thereto, the processor is configured or programmed to determine whether it is possible for the agricultural machine to travel on the road or not, based on a width and/or a length of the implement.

15. The agricultural road identification system of claim 1, further comprising a sensor to sense a vibration of the agricultural machine; wherein
    the processor is configured or programmed to acquire a third information on a degree of vibration of the agricultural machine based on a signal output from the sensor, and identify whether the road is an agricultural or not based further on the third information.

16. The agricultural road identification system of claim 15, wherein the processor is configured or programmed to determine whether an index value representing the degree of vibration of the agricultural machine is larger than a predetermined value or not, and when the index value is larger than the predetermined value, identify whether the road is an agricultural road or not.

17. The agricultural road identification system of claim 1, wherein the processor is configured or programmed to evaluate a roughness of the ground based on the first sensing data, and identify whether the road is an agricultural road or not based further on the roughness of the ground.

18. The agricultural road identification system of claim 1, wherein when determining that the road is an agricultural road, the processor is configured or programmed to set a path for the agricultural machine along the road based on the first sensing data and the second sensing data.

19. A control system, comprising:
   the agricultural road identification system of claim 1; and
   a controller configured or programmed to control travel of the agricultural machine.

20. An agricultural machine, comprising the control system of claim 19.

\* \* \* \* \*